US009429421B2

(12) United States Patent
Kessler et al.

(10) Patent No.: US 9,429,421 B2
(45) Date of Patent: Aug. 30, 2016

(54) DISTORTION QUANTIFIER FOR ANALYZING SURFACES

(71) Applicant: Apple Inc., Cupertino, CA (US)

(72) Inventors: Patrick Kessler, San Francisco, CA (US); Jason Bakhshi, San Francisco, CA (US); Katherine J. Spriggs, Palo Alto, CA (US); Akhil Suri, Delhi (IN)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 14/446,259

(22) Filed: Jul. 29, 2014

(65) Prior Publication Data

US 2016/0033262 A1 Feb. 4, 2016

Related U.S. Application Data

(63) Continuation of application No. PCT/US2014/048668, filed on Jul. 29, 2014.

(51) Int. Cl.
*G06T 7/00* (2006.01)
*G01B 11/25* (2006.01)
*H04N 5/225* (2006.01)

(52) U.S. Cl.
CPC .............. *G01B 11/25* (2013.01); *G06T 7/0006* (2013.01); *H04N 5/2256* (2013.01); *G06T 2207/10004* (2013.01)

(58) Field of Classification Search
None
See application file for complete search history.

(56) References Cited

U.S. PATENT DOCUMENTS

| 6,493,096 | B1 | 12/2002 | Maeda et al. |
| 2008/0205748 | A1 | 8/2008 | Lee et al. |
| 2009/0040532 | A1 | 2/2009 | Kawasaki et al. |
| 2010/0315422 | A1* | 12/2010 | Andre ............... G06T 7/0057 345/426 |
| 2011/0063625 | A1 | 3/2011 | Zettler et al. |
| 2013/0070087 | A1* | 3/2013 | Potapenko .......... C03B 17/064 348/135 |
| 2013/0088575 | A1* | 4/2013 | Park ..................... G06T 7/0057 348/46 |

FOREIGN PATENT DOCUMENTS

JP  09-304029 A  11/1997

OTHER PUBLICATIONS

PCT/US2014/048668 International Search Report & Written Opinion dated Apr. 29, 2015.

* cited by examiner

*Primary Examiner* — Kevin McInnish
(74) *Attorney, Agent, or Firm* — Downey Brand LLP

(57) ABSTRACT

This application relates to determining uniformity of a housing for a computing device based on characteristics of a reflected pattern of light incident upon the housing. The reflected pattern of light can include an array of shapes such as dots whose orientation and location can provide indications of uniformity for the housing. The array of shapes are analyzed to determine certain geometric properties such as area for each shape in the array of shapes. The geometric properties can thereafter be compared to a predetermined geometric, threshold, or tolerance value, and each shape can be assigned a rank of uniformity. Once a rank of uniformity is defined for each shape, a compilation of uniformity values can be generated and used to find portions on the housing where the housing is not uniform or flat.

20 Claims, 21 Drawing Sheets

DISTORTION QUANTIFIER FOR ANALYZING SURFACES

CROSS-REFERENCE TO RELATED APPLICATIONS

This application is a continuation of International Application PCT/US14/48668, with an international filing date of Jul. 29, 2014, entitled "DISTORTION QUANTIFIER," the disclosure of which is incorporated herein by reference in its entirety.

The U.S. Pat. No. 8,432,395 B2 by Andre et al, filed Sep. 11, 2009 is herein incorporated by reference for all purposes.

TECHNICAL FIELD

The present invention relates generally to the estimation of a three dimensional surface shape of an object. More particularly, methods, software, hardware, and systems are described for rapidly determining the surface profile of an object from a photographic image of a reflected light pattern from the object.

BACKGROUND OF THE INVENTION

Accurately measuring the three dimensional shape of a manufactured part, such as a casing or enclosure, can be accomplished using a mechanical profilometer, which measures a vertical displacement of a stylus in contact with the manufactured part for different horizontal movements. While accurate, the mechanical profilometer can be slow and therefore inappropriate in a high volume manufacturing or a rapid prototyping environment that requires quick results. In addition, contact measurement can be undesirable because of potential damage to the surface of the manufactured part.

SUMMARY

This paper describes various embodiments that relate to systems, methods, and apparatus for accurately measuring the three dimensional shape of a manufactured part, such as a casing, housing, or enclosure. In some embodiments, a system is set forth comprising a computing device capable of performing image analysis, a light emitting device operatively coupled to the computing device, and a light capturing device operatively coupled to the computing device. The light emitting device is configured to emit a pattern of light, comprising an array of disconnected shapes, onto a reflective surface. The light capturing device is configured to receive the resulting reflected pattern of light from the reflective surface. Additionally, the computing device is configured to perform an image analysis on the reflected pattern of light in order to provide an estimate of surface uniformity for the reflective surface, wherein the image analysis includes calculating an area of each reflected quadrilateral in a plurality of reflected quadrilaterals defined by the reflected pattern of light.

In other embodiments, a method of determining uniformity of a surface of a housing for a computing device is set forth. The method can include receiving pattern data generated from a light pattern reflected from the surface, wherein the light pattern includes an array of shapes. The method can further include determining, based on the pattern data, a geometric property of each shape in the array of shapes. Additionally, the method can include determining, based on the geometric property, a uniformity rank for each shape in the array of shapes. Moreover, the method can include causing a compilation of uniformity ranks to be generated, wherein each uniformity rank of the compilation of uniformity ranks are arranged based on the array of shapes of the light pattern.

In yet other embodiments, a machine-readable non-transitory storage medium is set forth. The storage medium can store instructions that, when executed by a processor included in a computing device, cause the computing device to carry out steps that include receiving a reflected array of dots originating from a light source, wherein the reflected array of dots defines a plurality of shapes, and the reflected array of dots were reflected from a surface. The steps can further includes determining a distance between each dot in the reflected array of dots, and determining a geometric property for each shape of the plurality of shapes, wherein each shape is defined at least by the distance between each dot of the reflected array of dots. The steps can further include storing a rank of uniformity for each shape based on the geometric property for each shape.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

The present invention relates generally to the estimation of a three dimensional surface shape of an object. More particularly, methods, software, hardware, and systems are described for rapidly determining the surface profile of a reflective object from a photographic image of a reflected light pattern.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

Figure 1:
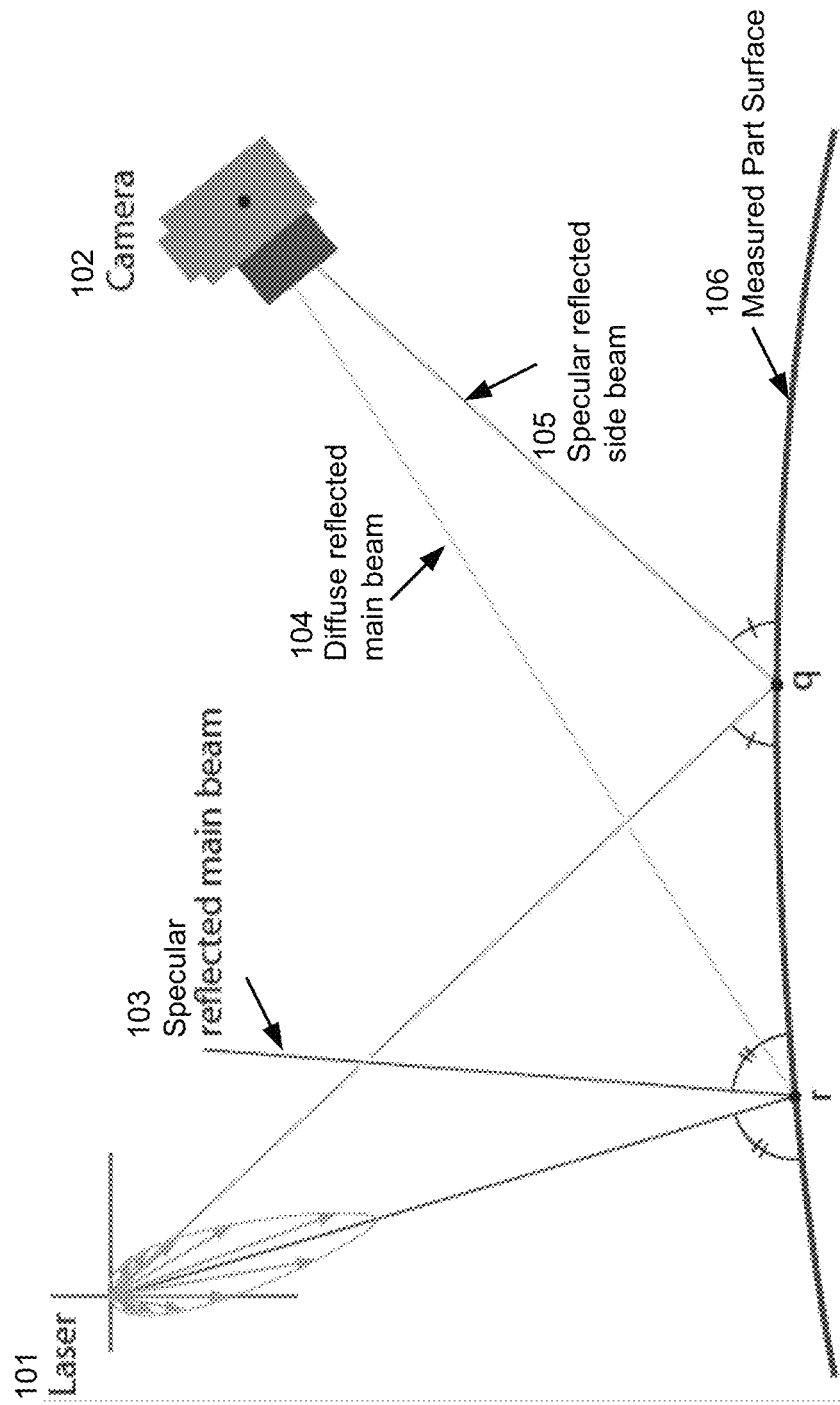
FIG. 1 illustrates an optical measurement system.

Non-contact optical profilometers have been developed that can measure laser generated light reflected from the surface of a measured part as shown in FIG. 1. A laser 101 can direct light in a narrow angle onto the surface of a measured part 106. If the measured part surface 106 reflects the light diffusely, then a portion of the light (diffuse reflected main beam 104) reflected at point "r" can be captured by a camera 102 located at a fixed position. Depending on the surface reflectivity of the measured part, the camera 102 can also receive at the same fixed position a specular reflected side beam 105 reflected from point "q". Because of the narrow angle of light emitted from the laser 101, this reflected side beam 105 can be much weaker than a specular reflected main beam 103, which cannot be captured by the camera 102 at its fixed location, as the specular reflected main beam 103 falls outside the camera's field of view. Laser profilometers typically measure shape using the "main beam" light reflected from the point "r" rather than the "side beam" light reflected from the point "q" and therefore prefer a sufficiently matte, diffusely reflecting, surface. A specular reflective surface can be sprinkled with talcum powder, for example, to render the surface suitable for laser measurement. While again such systems can provide accurate results, the measurement process can be slow, and the specialized measurement equipment can be costly.

As further discussed herein, a three dimensional surface shape of a specular reflective object can be determined by examining a captured image reflected from the object. Flat specular reflective surfaces, e.g. a mirror, provide an undistorted reflected image, while curved surfaces reflect a distorted image altered by the surface shape. Even small surface irregularities can become large distortions in the reflected image. By analyzing one or more captured images of the distorted reflection, one can estimate the shape of the surface that caused the distortion. A captured distorted image can be compared to a reference undistorted image for which one knows some geometric properties. For example, one can project a predetermined patterned image onto the reflective object and compare the predetermined pattern to a distorted reflection of the image pattern. A system to capture and process such images can be assembled from a few components including a computer to generate and process the images, a display to project the image onto the reflective object, a digital camera to capture the reflected image and a positioning device on which to orient the components with respect to each other.

A system for rapidly determining the surface shape of a reflective object, such as a glossy plastic or polished metal surface enclosure part, is disclosed herein. An embodiment of the system can use a digital camera to capture an image pattern (e.g. dot or line grid) reflected from the reflective object's surface. The captured image can be processed in a computational device to calculate the reflective object's shape and generate a three dimensional surface estimate and a surface contour map that illustrates surface deformation. For an image containing a number of distinguishable points, one can correlate points in the distorted reflected image to corresponding points in the original projected image and equivalently to points on the surface of the reflective object. Using the law of reflection, one can determine an orientation of the reflective surface at the distinguishable image points that depends on the distance between the reflective surface and the digital camera. For a relatively smoothly varying surface, the three dimensional surface estimate can be constructed iteratively using estimates of the surface orientation determined at image points nearby. The surface estimate and contour map can be used by manufacturing engineers to iterate rapidly and optimize a manufacturing process through a series of measurement experiments. The system can also provide quality engineers a low cost system to inspect manufactured parts in high volume. The disclosed system and method can be substantially faster and lower cost in operation that prior art laser and charge couple device systems and methods.

The system can also provide estimates of a reflective object's shape using an image pattern comprising an array of dots. The array of dots can be incident upon the reflective object, and the resulting reflected array of dots can be analyzed. Analysis of the reflected array of dots can include deriving various geometric characteristics from the reflected array of dots. For example, the reflected array of dots can define multiple polygons such as quadrilaterals, or some other suitable geometric shape. The multiple polygons have areas, angles, edge lengths, and other geometric properties that are indicative of features on the reflective object. One or more geometric properties for each polygon can be compared to a predetermined value, or the geometric properties of the original array of dots incident upon the reflective surface, in order to determine a uniformity rank or value for each polygon. The uniformity ranks can be colors, patterns, shades, numbers, characters, or any suitable symbol for representing a rank, value, or severity of a particular condition or feature. A compilation of each uniformity rank can then be generated by the system and arranged in a two-dimensional shape similar to the array of dots. In this way, the compilation of each uniformity rank can be used by a human or machine to visualize and analyze where certain non-uniform areas reside on the reflective object.

Figure 2:
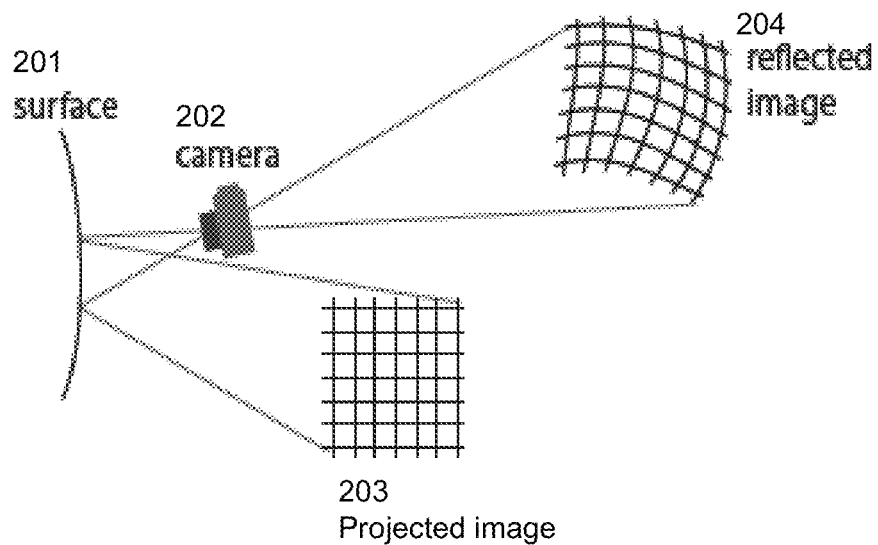
FIG. 2 illustrates distortion of a projected image by a specular reflective surface.

FIG. 2 illustrates a projected image pattern 203 captured by a camera 202 after reflection from a specular reflective surface 201. The captured reflected image 204 shows a distorted version of the projected image 203, where distortions in the reflected image can be correlated to the reflective surface 201 shape. Specular reflected images can reveal surface irregularities more readily than an image projected onto a diffuse reflective surface, as differences in surface orientation between adjacent points on the surface are magnified in the reflected image as the distance between the camera 202 and the specular reflective surface 201 increases. The captured two dimensional reflected image 204 can be used to estimate the three dimensional shape of the specular reflective surface 201.

Figure 3:
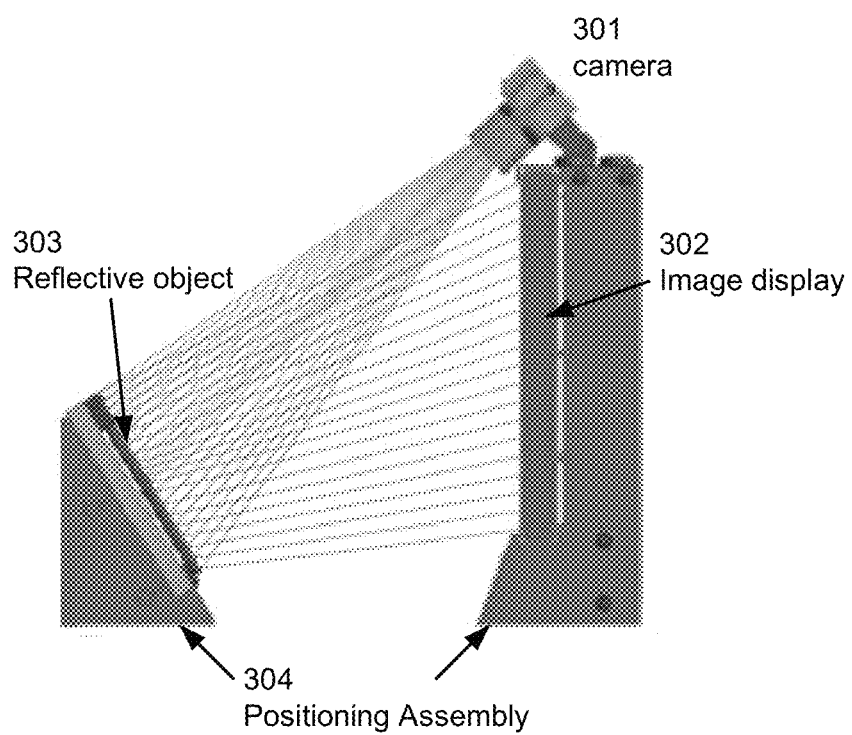
FIG. 3 illustrates an embodiment of a system to estimate the shape of a specular reflective object.

FIG. 3 illustrates an embodiment of a system for estimating the surface shape of a reflective object 303 in which a camera 301 captures a reflection from the reflective object 303 of an image pattern projected by an image display 302. The camera 301, image display 302 and the reflective object 303 can be oriented spatially with respect to each other by a positioning assembly 304. In an embodiment, the camera 301 can be adjusted to face the reflective object 303 to capture the reflected image. Depending on the size and shape of the reflective object 303, the lens attached to the camera 303 can be chosen to capture a preferred portion of the reflected image. The positioning assembly 304 can include a first member on which to place the reflective object 303 and orient its position with respect to the camera 301 and the image display 302 mounted on a second member of the positioning assembly 304. Rather than only adjusting the lens of the camera 301 to change the field of view, the positioning assembly 304 can also be adjustable allowing for different distances between the reflective object 303, the camera 301 and the image display 302. The image display 302 can project an image pattern that includes a plurality of light and dark regions so that the light regions can be captured by the camera 301. While a preferred embodiment of the invention described herein can use an array of light dots arranged in a regular grid on a dark background, other pattern images can be used such as a grid pattern of light and dark lines or a checkerboard pattern of light and dark squares. In some embodiments the image display 302 can project a pixilated image.

Figure 4:
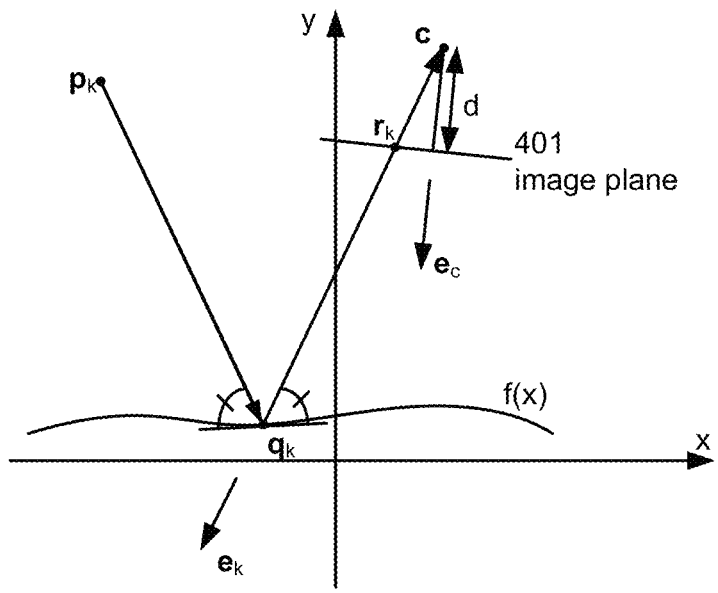
FIG. 4 illustrates a two-dimensional mathematical model for measurement of a reflection.

FIG. 4 illustrates a light ray originating from a point $p_k$ (which can represent one or more pixels of an image display device) and travelling toward a reflective surface depicted as curve f(x). (Vectors are denoted by bold face herein.) The light ray can reflect from a point $q_k$ on the curve f(x), where the angle of incidence of the light ray can equal the angle of reflection with respect to a tangent of the curve f(x) at $q_k$. The light ray can pass through a point $r_k$ of an image plane 401 in a camera positioned at point c. The camera can be pointed in a direction defined by a unit vector $e_c$ perpendicular to the image plane 401. The reflected light ray can travel from the point $q_k$ to the point c along a direction $-e_k$. (Note that the unit vectors $e_c$ and $e_k$ are generally not coincident.) In one embodiment, multiple points $p_1$, $p_2$, ..., $p_N$ arranged in a line can be projected on the curve f(x) resulting in a set of points $r_1, r_2, ..., r_N$ received on the image plane. The curve f(x) can be reconstructed using the set of received points $r_1, r_2, ..., r_N$ using knowledge of the transmitted points $p_1, p_2, ..., p_N$.

The distance d between the image plane 401 and the camera position c can be determined by comparing an actual distance of a reference feature on an object to a dimension in a captured image of the reference feature. In one embodiment, the reference feature can be a pair of distinguishable marks scribed on a part of the positioning assembly 304. In another embodiment, the reference feature can be a pair of distinguishable marks projected onto a flat object positioned in the positioning assembly 304. For an actual distance B between the two distinguishable marks on the object and a measured distance D from the reference feature to the camera position c, the distance d=(bD)/B. Calibration of the system shown in FIG. 3 can include rotating the camera to position one or more reference marks on the positioning assembly (or on a reference object placed in the positioning assembly) to preferred locations in a viewed camera image, e.g. in an optical viewfinder or on an electronic display. Calibration can also include determining the distance d between the camera position c and the image plane.

In general, a set of points $\{p_k\}$ can result in a set of points $\{r_k\}$ on the image plane 401. Portions of the function f(x) (or more generally a three dimensional surface) that curve inward (concave) can cause adjacent image points in the set of points $\{p_k\}$ to converge in a captured image, while portions that curve outward (convex) can cause adjacent image points to diverge. For a region R of a surface that reflects a pattern P into the camera, let g(P) denote the captured image pattern. To determine the shape of the surface region R, the mapping g(•) can be an injective function, i.e. g(•) can be a function (cannot map one point $p_k$ to multiple image points $r_k$) and g(•) can be one-to-one (cannot map two different points $p_k$ to a single image point $r_k$). If each image point $r_k$ can be linked to a unique source point $p_k$ (e.g. by using different colored source points, or by flashing the source points on/off at different times) then the shape of the region R can be uniquely determined. The shape of region R can also be determined by iteratively constructing a surface estimate starting from one or more distinct image points as outlined further herein.

Figure 5A:
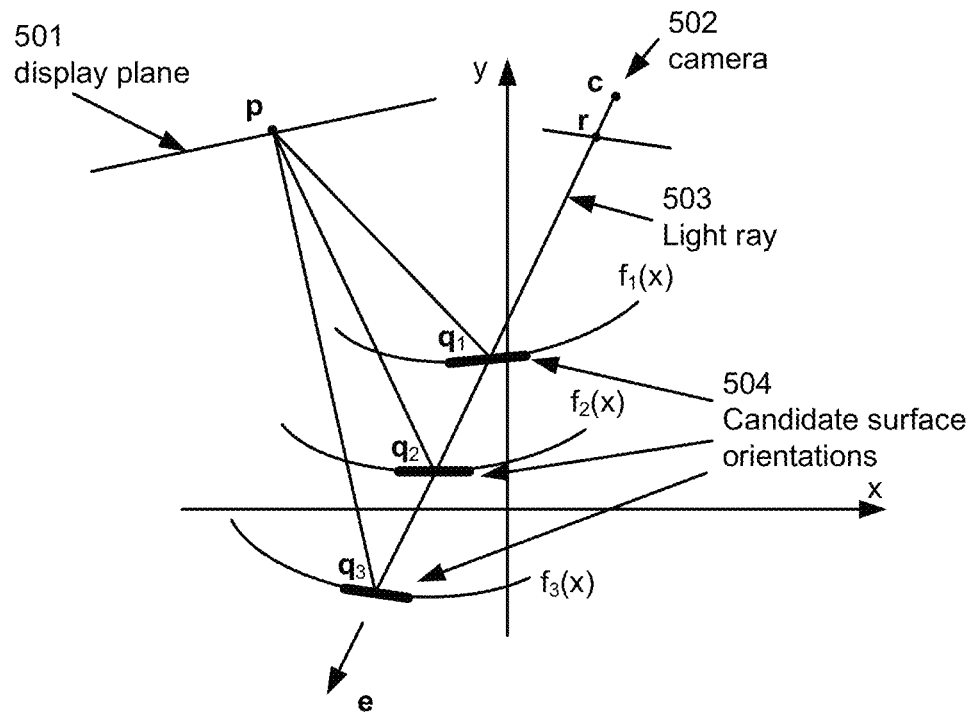
FIG. 5A illustrates multiple candidate reflective surface orientations for a fixed image capture position.
Figure 5B:
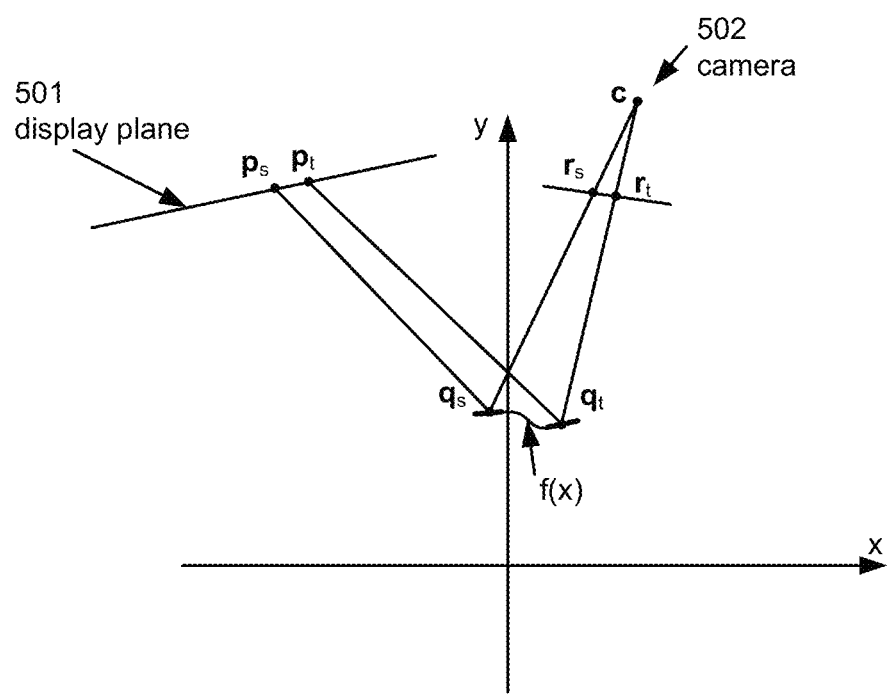
FIG. 5B illustrates connecting two neighboring points on a reflective surface estimate.

As shown in FIG. 5A, each ray of light entering a camera 502 along a light ray 503 and originating from a point p on a display plane 501 can be reflected by any of a plurality of surfaces. A single point r in a captured image can result from light reflected from the curve $f_1(x)$ at point $q_1$, or from curve $f_2(x)$ at point $q_2$, or from curve $f_3(x)$ at point $q_3$. As the angle of incidence must equal the angle of reflection at any reflective point, one can determine candidate surface orientations 504 at each possible intersecting reflective point along the direction –e into the camera 502. (The unit vector e in FIG. 5A corresponds to the unit vector $e_k$ in FIG. 4.) For a light ray that originates at the point p on the display plane 501 and a function f(x) that crosses the light ray 503 at a distance l away from the camera c, a unit tangential t and a unit normal n to the surface f(x) at a reflection point q is given by Equation (1)

$$t = -\frac{u+e}{\|u+e\|}, \quad n = \frac{u-e}{\|u-e\|}, \qquad (1)$$

where the reflection point q=c+le, and u is defined as the unit vector in the direction p–q. Each point r in a captured image can result from any of a plurality of surfaces, each positioned at a different distance from the camera c. To resolve this ambiguity, one can use information about the surface orientation determined for points in the captured image near the point r. As shown in FIG. 5B, starting with a first received image point $r_s$, for which one has determined a surface orientation that can occur at a corresponding reflection point $q_s$, one can determine a function f(x) that connects the reflection point $q_k$ to a reflection point $q_t$ that corresponds to a neighboring adjacent point $r_t$ in the captured image. Obviously numerous different functions can connect two points. In a preferred embodiment, one can use a smooth function that is tangential to the surface at each reflection point and has minimum curvature in between as will be detailed next.

Figure 6:
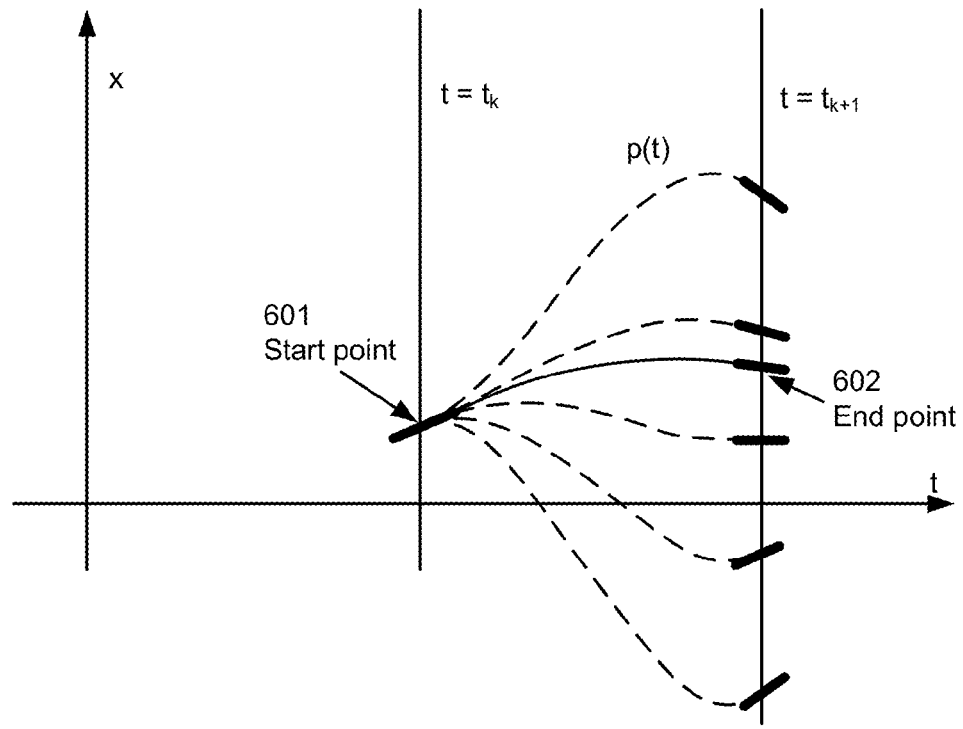
FIG. 6 illustrates connecting multiple candidate reflective surface orientations to a known start point surface.

FIG. 6 illustrates a first reflection point (start point 601 at $t=t_k$) having a known surface orientation that can connect to any one of a plurality of second reflection points (at $t=t_{k+1}$), each with a different surface orientation. The path p(t) that connects the two reflection points is tangential to the corresponding surface orientations at those reflection points, i.e. at $t=t_k$ and $t=t_{k+1}$. In one embodiment, p(t) is chosen to be a cubic polynomial function that connects the two reflection points. In a preferred embodiment, the path p(t) is chosen to minimize a curvature function($C^2 = \ddot{x}_k^2 + \ddot{x}_{k+1}^2$). In FIG. 6, the cubic polynomial path p(t) with minimum curvature is shown connecting the start point 601 to an end point 602. To determine which end point 602 results in the path p(t) with minimum C, we can iteratively solve for a value of $x_{k+1} = \gamma$. For each $\gamma$, the cubic polynomial path p(t) between $t_k$ and $t_{k+1}$ that has the correct slope at both the start point 601 ($t=t_k$) and at an end point ($t=t_{k+1}$) can be given by Equation (2)

$$p(t) = x_k a(t) + \dot{x}_k \alpha(t) + \gamma b(t) + g(\gamma)\beta(t) \quad (2)$$

where $g(\gamma) = f(\gamma, t_{k+1})$, and where the basis polynomials a(t), b(t), $\alpha$(t), and $\beta$(t) can be given by Equations (3), (4), (5) and (6)

$$a(t) = \frac{2}{d^3}(t - d/2)^3 - \frac{3}{2d}(t - d/2) + \frac{1}{2} \quad (3)$$

$$\alpha(t) = \frac{t}{d^2}(t - d)^2 \quad (4)$$

$$b(t) = \frac{2}{d^3}(d/2 - t)^3 - \frac{3}{2d}(d/2 - t) + \frac{1}{2} \quad (5)$$

$$\beta(t) = \frac{t^2}{d^2}(t - d) \quad (6)$$

where $d = t_{k+1} - t_k$. The curvature function C is the 2-norm of $u = a + \gamma b + g(\gamma)c$ where $$a = x_k \frac{6}{d^2}\begin{bmatrix}-1\\1\end{bmatrix} + \dot{x}_k \frac{2}{d}\begin{bmatrix}-2\\1\end{bmatrix} \quad (7)$$

$$b = \frac{6}{d^2}\begin{bmatrix}1\\-1\end{bmatrix} \quad (8)$$

$$c = \frac{2}{d}\begin{bmatrix}-1\\2\end{bmatrix} \quad (9)$$

The nonlinearity of the function g($\gamma$) is usually weak, and so an iteration as defined in Equation (10)

$$\gamma_{i+1} = \gamma_i - \frac{\langle (a + g(\gamma_i)c), b\rangle}{\langle b, b\rangle} \quad (10)$$

can converge to a value for $x_{k+1}$ to within a preferred level of numerical precision within a few steps. Herein the notation $\langle a,b \rangle$ denotes a dot product between vectors a and b. By choosing a smooth, cubic polynomial path p(t) with least curvature, one minimizes changes in slope between the start point and the end point where one lacks information.

Figures 7, 8:
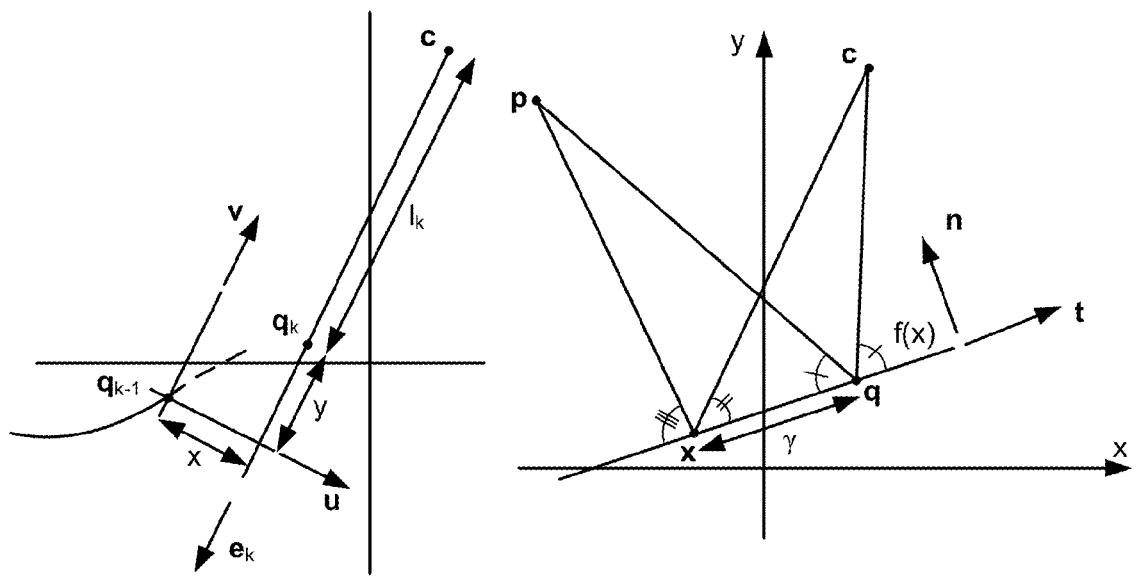
FIGS. 7 and 8 illustrate additional mathematical models for measurement of a reflection.

FIG. 7 applies the idea discussed above with respect to FIG. 6 to extending a curve that can start at point $q_{k-1}$ and can end at a point $q_k$. For a light ray entering a camera situated at point c along a direction $-e_k$, one can determine a slope for each possible reflection point that can occur along the light ray. Suppose we have determined the point $q_{k-1}$ (and necessarily the slope at $q_{k-1}$), and we want to find the point $q_k = c + l_k e_k$ along the light ray (i.e. determine the distance $l_k$ between the reflection point $q_k$ and the camera point c). Consider the unit vectors u and v defined to be perpendicular to and tangential to the light ray into the camera point c respectively. In particular let $v = -e_k$ and $u = Re_k$, where $$R = \begin{bmatrix}0 & -1\\1 & 0\end{bmatrix}$$

is a 90 degree counter clockwise rotation matrix. Using the rotated (u,v) coordinate system let x be the distance in the u direction and y be the distance in the v direction from the point $q_{k-1}$ to the point $q_k$. Because the distance $l_k$ can be given by $l_k = \langle e_k, q_{k-1} - c \rangle - y$, one can determine $l_k$ by solving for the distance y. Solving for the point $q_k$ is the same as described for determining the position of the end point 602 in FIG. 6 (where the rotated axes u and v in FIG. 7 correspond to the axes t and x in FIG. 6 respectively). A normal vector n perpendicular to curves that cross the light ray at different values of y can be determined using Equation (1). The corresponding slope of the curve at the point $q_k$ in the rotated coordinate frame can be determined by Equation (11)

$$\frac{dy}{dx} = -\frac{\langle n, u\rangle}{\langle n, v\rangle}. \quad (11)$$

The values of the distance y and the slope $$\frac{dy}{dx}$$

in Equation (11) correspond to the values $\gamma$ and g($\gamma$) used for the iteration of Equation (10). Thus we can use the iterative method described above to determine a solution for the point $q_k$.

Accuracy of the method described above for determining an estimate of a point on a surface can be checked by simulating an image capture. In the simplest case, consider a reflective surface f(x) that is a line as shown in FIG. 8. Define n and t to be the unit normal and unit tangential vectors to the line f(x) respectively, and let x be a point on the line that is not necessarily the reflection point. (Note that the angle of incidence and the angle of reflection are shown as unequal at the point x and equal at the reflection point q.) The reflection point $q = x + \gamma t$ on the line f(x) for light originating from a point p can be given by Equation (12).

$$\gamma = \frac{\langle n, c-x \rangle \langle t, p-x \rangle + \langle n, p-x \rangle \langle t, c-x \rangle}{\langle n, c-x \rangle + \langle n, p-x \rangle} \quad (12)$$

If the reflective surface f(x) is a curve instead of a line, then one can iterate a sequence of points $x_i$ such that the reflection point $$q = \begin{bmatrix} \tilde{x} \\ f(\tilde{x}) \end{bmatrix}$$

is defined by a limit $\tilde{x}$ of the sequence of points $x_i$. Given a reflective surface f(x) and a set of points $p_k$, with these constructions one can generate each of the resulting image points $r_k$ captured on the image plane of the camera situated at point c. Thus one can simulate capturing an image of a reflection. To test the accuracy of the surface estimation method described above, one can start with a known reflective surface f(x), use ray tracing to compute a set of points of a simulated captured image, construct an estimate of the reflective surface g(x) from the simulated captured image, and compute a error difference f(x)–g(x) between the original reflective surface f(x) and the constructed reflective surface g(x).

Figure 9:
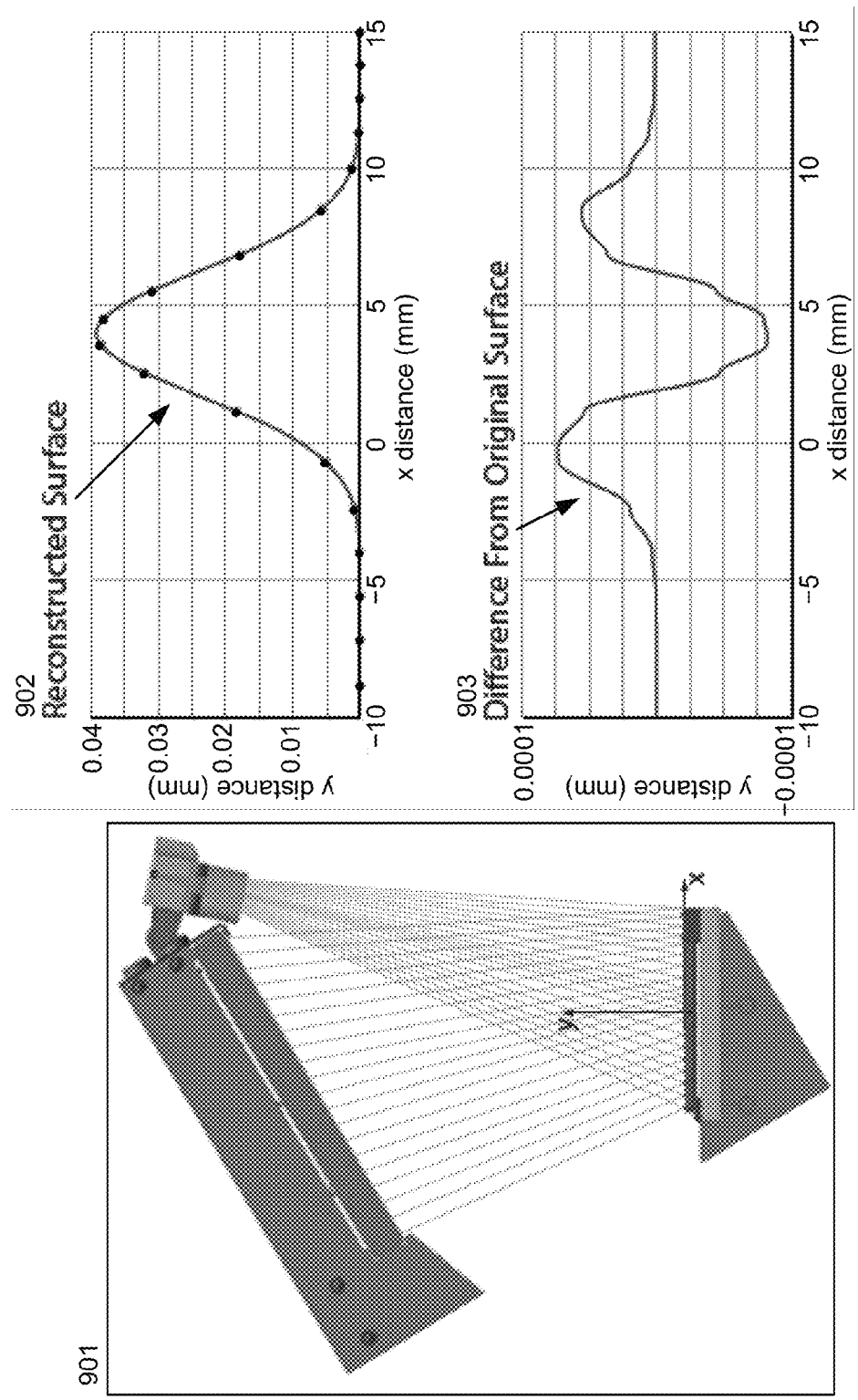
FIG. 9 illustrates a reconstructed surface shape and an estimation error.

FIG. 9 illustrates an image capture simulation for a system 901, where a line of transmitting image points are reflected from a surface $f(x)=0.04e^{-0.1(x-4)^2}$. Using a simulated captured image containing a line of received image points, a reconstructed estimate g(x) of the surface shown as reconstructed surface 902 can be determined. A deviation from the original (i.e., f(x)–g(x)) shown as error 903 can be calculated that shows that the reconstructed surface g(x) is never more than 1 um away from the original surface f(x). This error difference from the surface estimation can be less than other sources of error in the measurement system, thus the accuracy of the method proposed can suffice. Additional simulations can show that the reconstruction error can increase as the peak of the surface f(x) becomes sharper and can decrease as the number of captured image points increases.

Figures 10A, 10B:
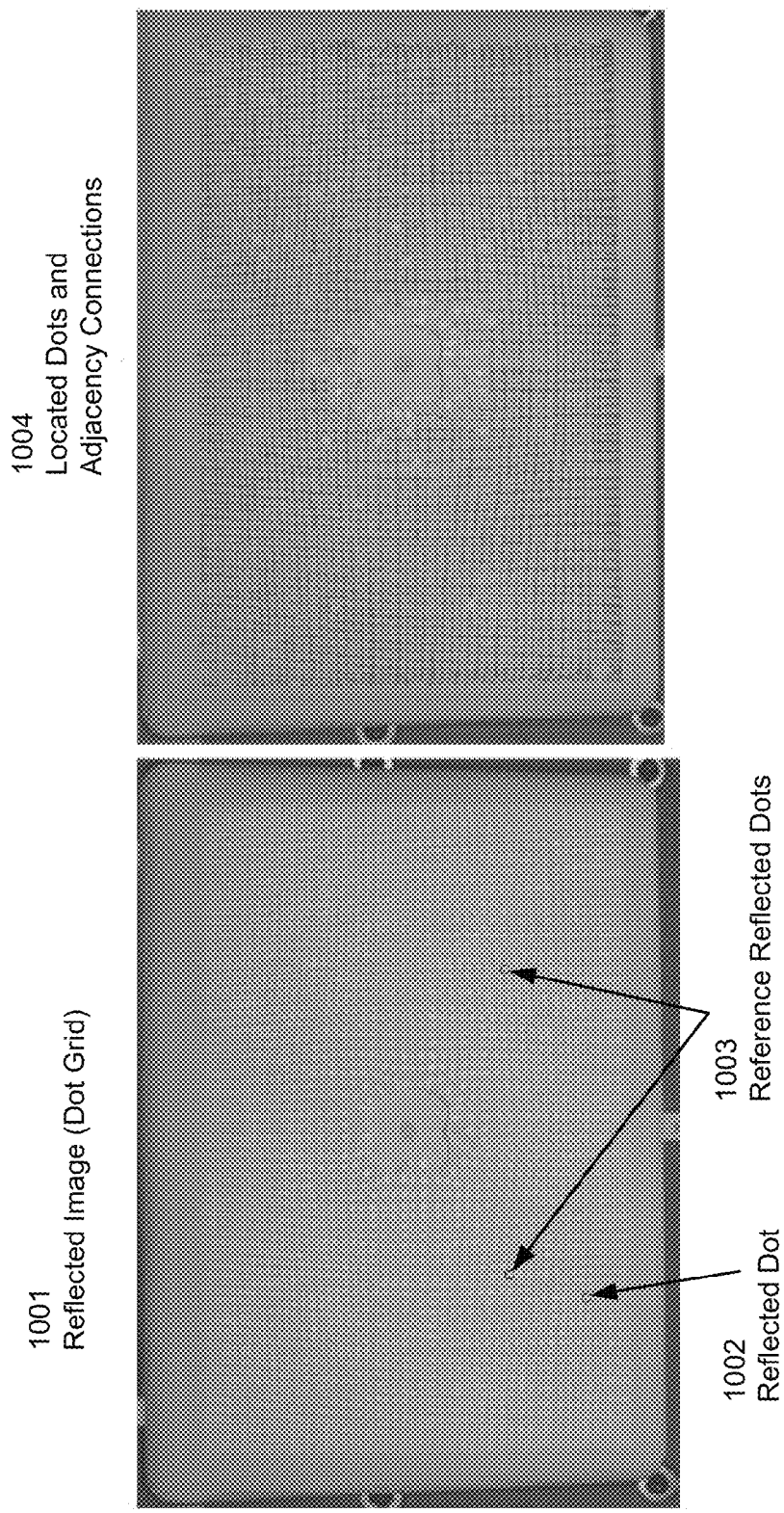
FIGS. 10A and 10B illustrate an estimation of a reflected image pattern.

The method described above for estimating a reflective surface (curve) f(x) in two dimensions can be extended analogously to three dimensions. Instead of tangent lines to a reflective curve, one can have tangent planes to a reflective surface. The unit normal vector n can be perpendicular to the tangent plane at a reflection point q on the reflective surface. FIG. 10A illustrates a captured image reflection 1001 of an array of image points (dot grid) reflected from a surface of a glossy plastic electronics enclosure. Each reflected dot 1002 can correspond to a transmitted dot projected from an image display (for example one or more adjacent "lit" pixels of a flat panel display). One or more reference dots 1003 can be included in the projected image that can be used to calibrate the system. These reference dots can use a different color to distinguish them from the other dots in the projected image. FIG. 10B illustrates a set of located dots 1004 extracted from the captured reflected image 1001, each dot connected by line segments to adjacent neighboring located dots. A three dimensional surface estimate can be constructed using the coordinate locations of the dots and their adjacency information.

Figure 10C:
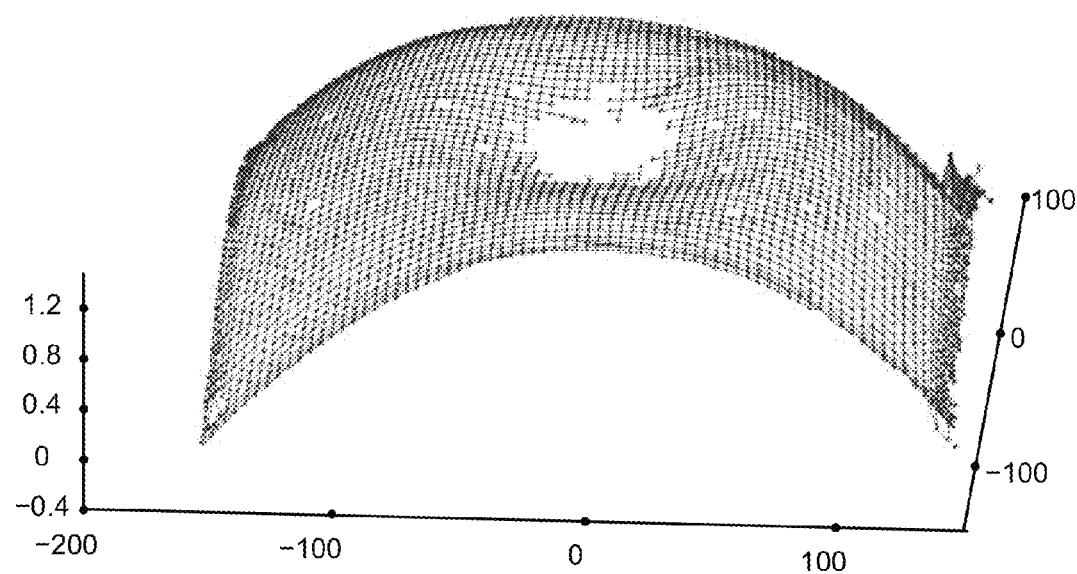
FIGS. 10C and 10D illustrate a three dimensional surface estimate of the reflected image pattern of FIG. 10A.
Figure 10D:
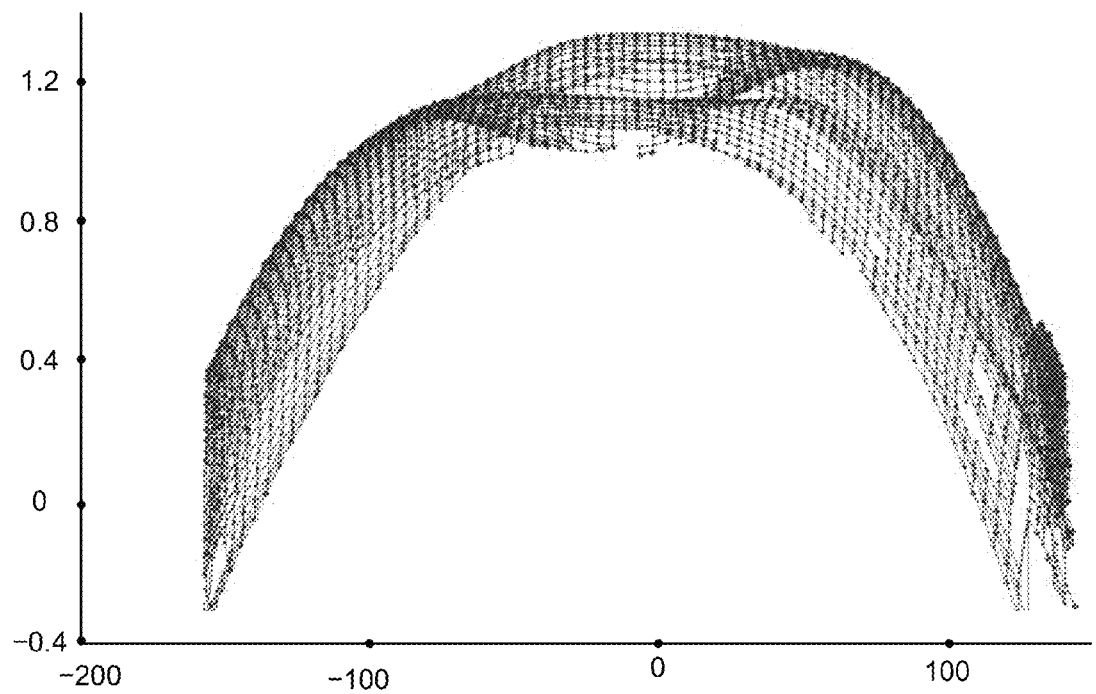
Figure 10E:
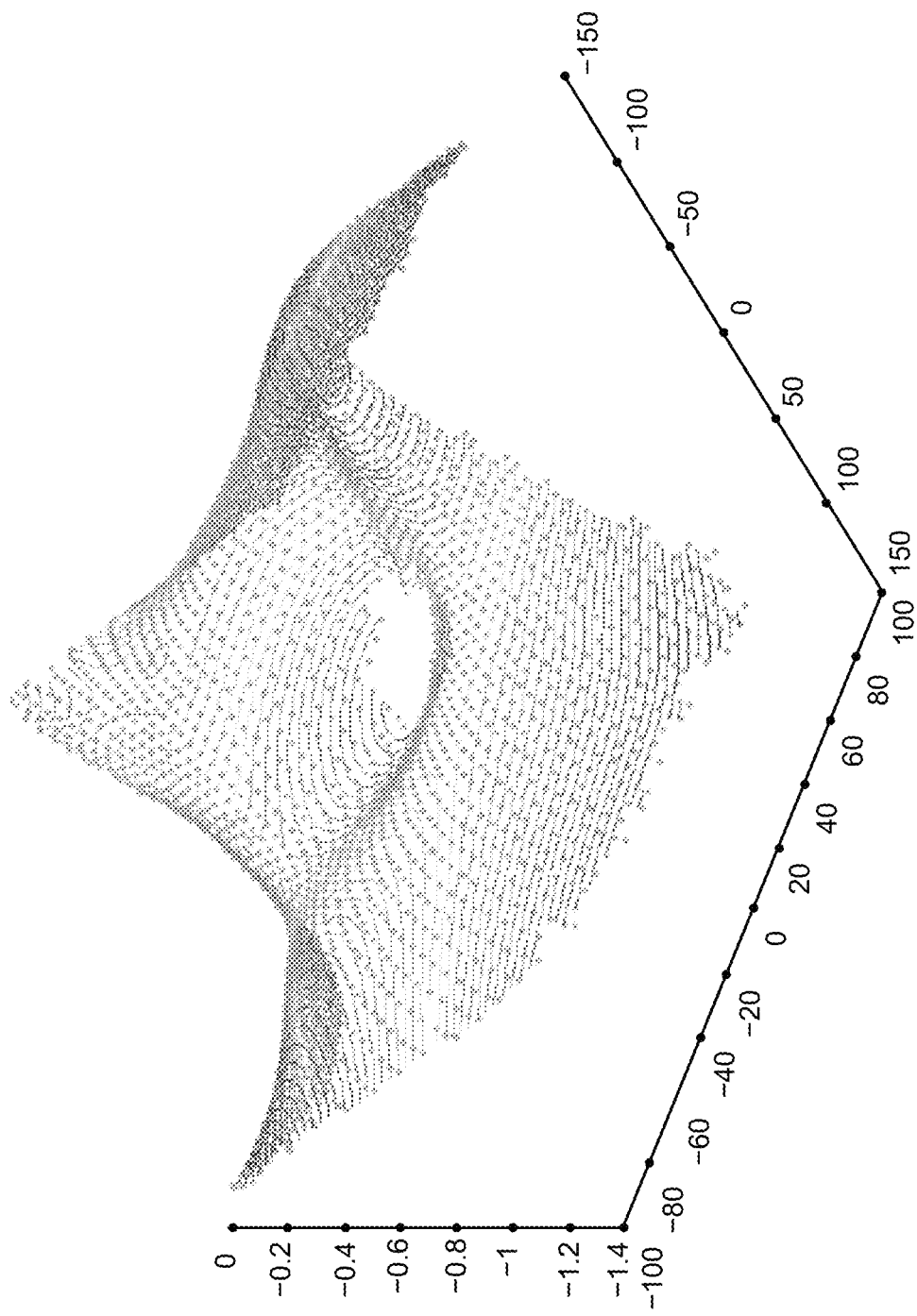
FIG. 10E illustrates the three dimensional surface estimate of FIG. 10C including surface contours.
Figure 10F:
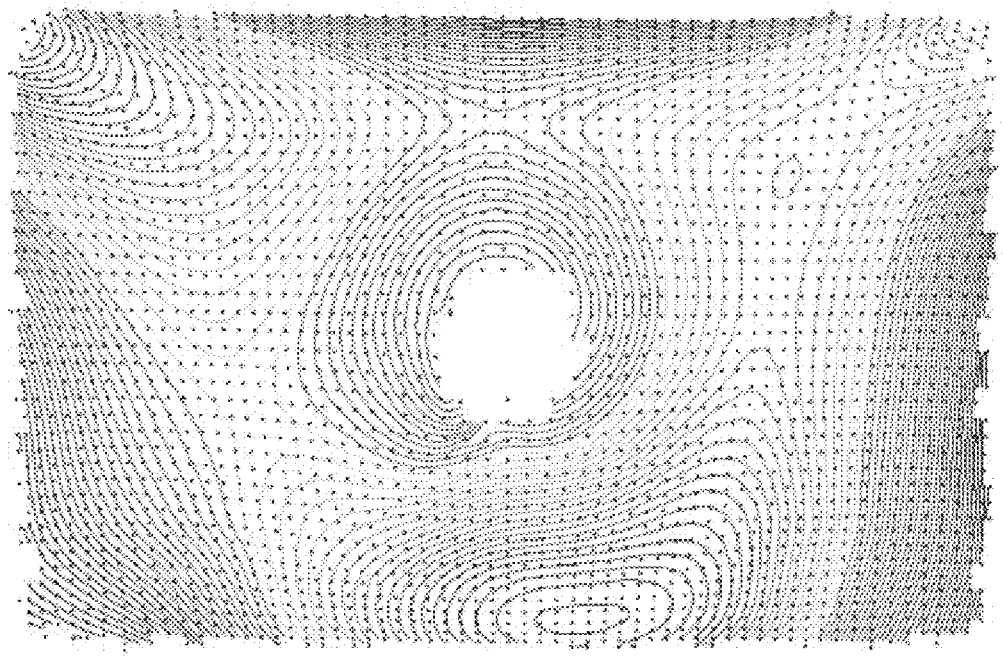
FIG. 10F illustrates a surface contour map of the three dimensional surface estimate of FIG. 10E generated using an embodiment of the invention.
Figure 10G:
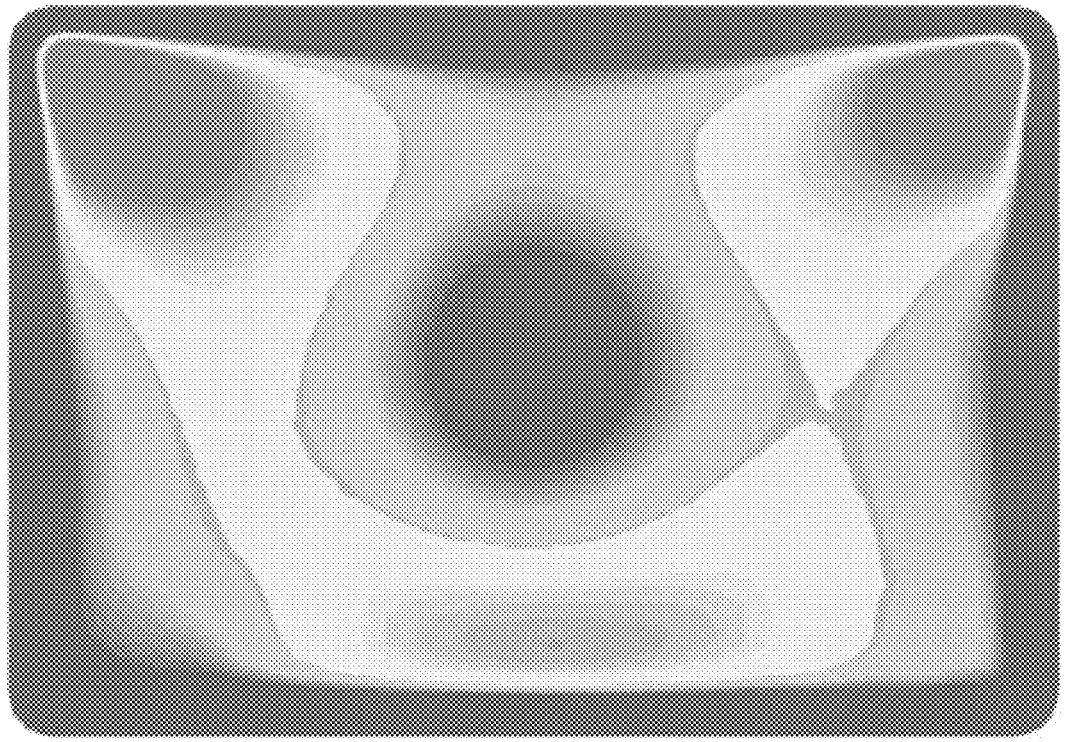
FIG. 10G illustrates a surface contour map using a prior art laser measurement system.

Given a three dimensional location a of a first dot, one can determine the three dimensional location b of a second neighboring dot by using the two dimensional iterative solution described above for FIGS. 6 and 7. Consider the two dimensional plane P defined by the point a and a line through b (i.e. a light ray reflected from b) to an image capture device (camera). Starting with the three dimensional location a and hence the orientation of the surface through the location a (which defines the slope of the surface through the location a in the two dimensional plane P), one can estimate a three dimensional location b. For the same light ray corresponding to a particular image point in the captured reflected image, one can construct an estimate for b starting from each of multiple adjacent neighboring points for which one has already estimated a location and surface orientation. Thus one can average several estimates for the location b using several different starting points a to improve accuracy. Each starting point a defines a different plane together with the light ray through the point b. In one embodiment of the invention using a regular grid of image points, a new estimated point location can be added to the surface estimate by averaging the three dimensional locations calculated by starting at its eight nearest neighbors. (Only neighboring points that are already part of the surface estimate can be used as a starting point.) FIGS. 10C and 10D illustrate two views of a constructed three dimensional surface estimate using the method described. FIG. 10E provides another view in which the adjacency connections between image points are removed and equidistant contours (in the z direction) are drawn. Adjacent contour lines differ by 20 microns in FIG. 10E. FIG. 10F illustrates the contour map of FIG. 10E viewed from above. Contour maps can provide a consistent means to compare surface estimates generated from captured images of multiple samples of a manufactured part. The units for the axes in FIGS. 10C, 10D, 10E and 10F are given in mm. Using a single image capture, a three dimensional surface estimate can be calculated in a few seconds compared with the minutes or longer the would be required by prior art methods. The accuracy of the method can be empirically confirmed by comparing the contour map of FIG. 10F to a surface deformation measurement of the same part illustrated in FIG. 10G performed using a prior art laser scanning device. As shown in FIG. 10G, the contour map of the estimated surface correlates well to the laser scan.

Figure 11:
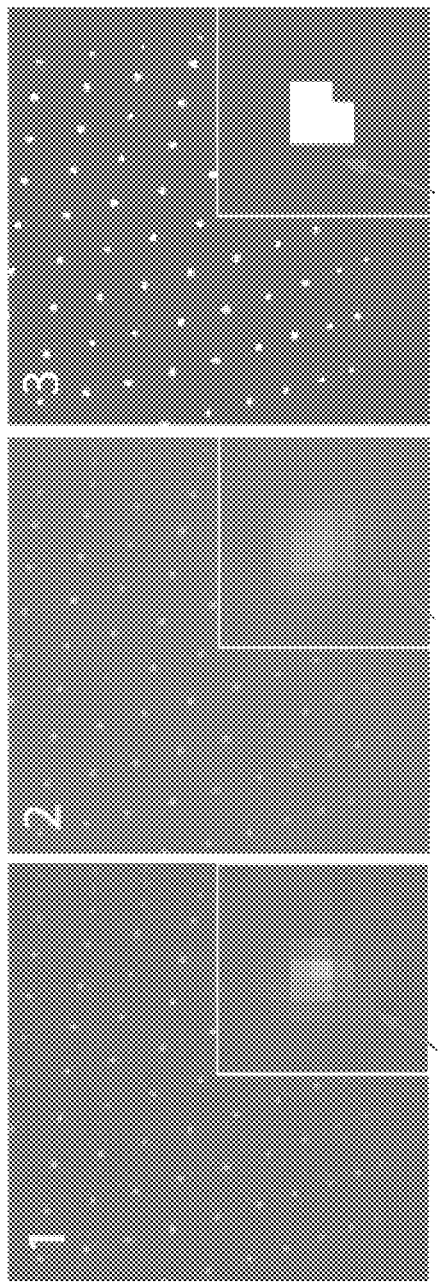
FIG. 11 illustrates image processing on a pixilated captured image.

As described above, a three dimensional surface of a specular reflective object can be estimated using a two-dimensional image capture of a projected image reflection. The projected image can include a regular pattern, such as an array of dots. These dots can be located in the captured image as described next. Each projected dot will correspond to a cluster of pixels (pixilated reflected dot 1101) in a digital captured image as shown in FIG. 11. Note that for the purpose of locating the dots, the captured image illustrated in FIG. 11 has been reduced to a monochrome image, which can be derived from one or more color (red, green, blue) channels in the captured color image generated by a digital still camera. In a digital still camera with a Bayer array of pixels, the green channel can provide the most information and thus can be preferred. Using an array of numbers, each number representing a value for the green channel in a captured image, we can create a smoothed image by low pass filtering each pixel. For example, we can average the values for each pixel using the values of its surrounding (nearest neighbor) pixels. A filtered pixilated reflected dot 1102 is shown after low pass filtering the pixilated reflected dot 1101 in FIG. 11. Note that the filtered pixilated reflected dot 1102 contains more pixels with a lower peak value than the captured pixilated reflected dot 1101. Each value for a pixel in the filtered image can then be converted to a binary value (i.e. black or white only) depending upon a threshold resulting in a binary pixilated reflected dot 1103. The low pass filtering (smoothing) operation ensures that dots do not split into multiple pixel clusters after the threshold operation. Alternatively one can exclude the low pass filtering operation and directly generate a binary pixilated image from the captured monochrome image (possibly resulting in multiple distinct "white" pixels for each pixel cluster corresponding to a single reflected dot). The resulting binary pixilated image can be transformed by expanding each "white" pixel into a 3×3 (or some other pattern) of "white" pixels, thereby "dilating" each pixel into a larger cluster of pixels. Using either method, the resulting binary pixilated image preferably contains a distinct, undivided cluster of "white" pixels corresponding to each captured reflected dot.

Figure 12:
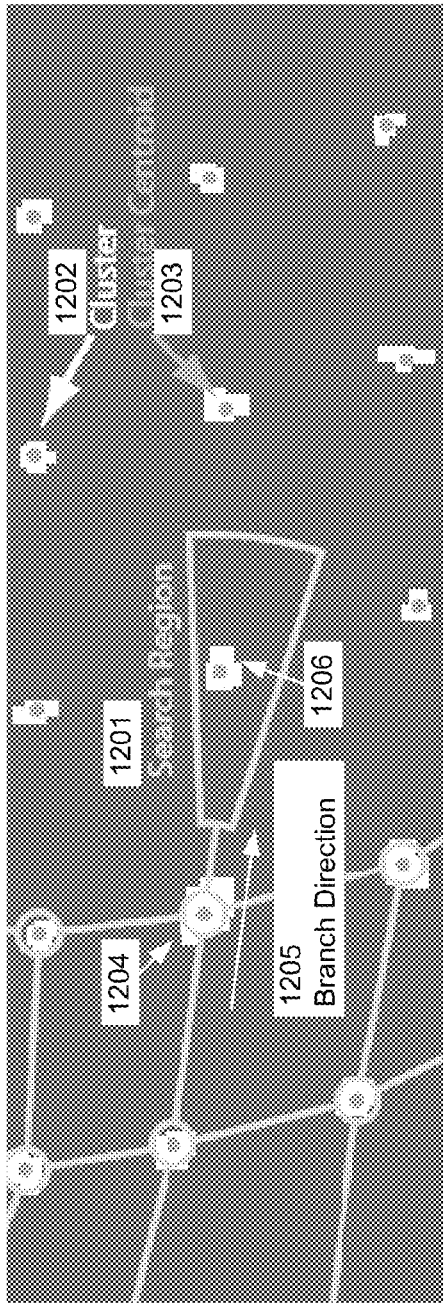
FIG. 12 illustrates elements used to estimate an image pattern.

A two dimensional geometric location for each dot can be determined from the binary pixilated image as the centroid of each cluster of "white" pixels. FIG. 12 illustrates a cluster of pixels 1202 and a cluster centroid 1203 of a neighboring cluster of pixels. One method to identify all pixels in each cluster can be to assign an integer to each "white" pixel in the image. This can be done by working through the image pixels one by one. If a new pixel is white, and has no neighboring pixels that are white, the pixel can be assigned a new integer. If the new white pixel has neighboring white pixels that are already labeled, the new pixel can be assigned the minimum of the integers assigned to its labeled white neighbors. After a first pass, some of the pixels in the same cluster can have been assigned different integers, but this multiple assignment can be fixed by a second pass. Having identified the pixels comprising each cluster, the centroids of the pixel clusters can be computed. Next, one can determine the generating dot corresponding to each pixel cluster centroid. This correspondence can be determined by branching out from one or more reference dots, which can be identified (before monochrome and binary conversion) uniquely based on a different captured color from the remaining dots in the projected image (e.g. the reference dots can be colored blue instead of white). A neighboring centroid can be connected to an existing identified centroid by searching in an annular region defined (when possible) along the direction of branches already established. FIG. 12 shows one possible annular search region 1201 that extends along a branch direction 1205 from a centroid 1204 and identifies a neighboring centroid 1206. Using the calculated centroids and the relationship among them, one can then estimate the surface shape of a reflective object that "distorts" the projected image pattern as described above.

Accuracy of the surface shape estimate can depend on the spacing between dots in the projected image pattern. More closely spaced dots can provide more information about the surface shape; however, the curvature of the surface across some areas of the reflective object can cause adjacent projected dots in the projected image to be very close together in the reflected image. In FIG. 10A the dots near the edge of the reflected image 1001 appear to nearly merge together, and the corresponding located dot pattern 1004 shown in FIG. 10B contains some holes near the edge where dots could not be located. Accuracy in certain regions of the surface can be improved by changing the density of the dot grid (or the size of each dot) to ensure distinguishable (but still closely spaced) dots. In addition one can also change the position of the image capture device or the orientation of the reflective object to provide a different angle of view. One can also change the magnification of the field of view by altering the focal length of the camera lens to capture a specific region of the specular reflective object. A composite estimate of the specular reflective surface can then be assembled from multiple images captured using different projected image patterns, different spatial orientations, or different fields of view or any combination thereof.

Figures 13A, 13B:
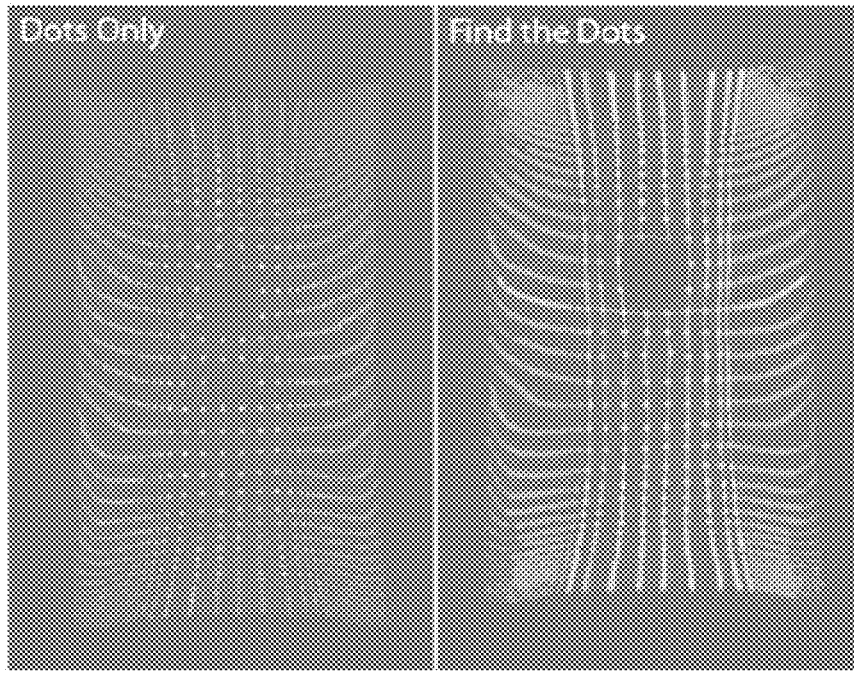
FIGS. 13A, 13B, 13C and 13D illustrate captured images and surface shape estimates of a reflective object.
Figures 13C, 13D:
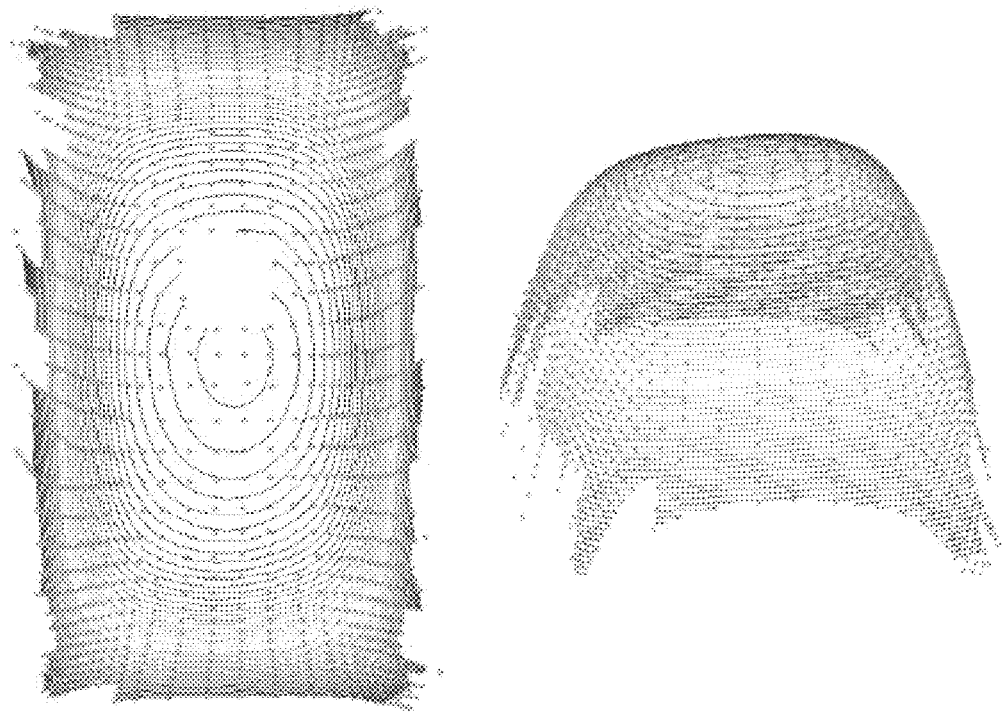
Figure 14:
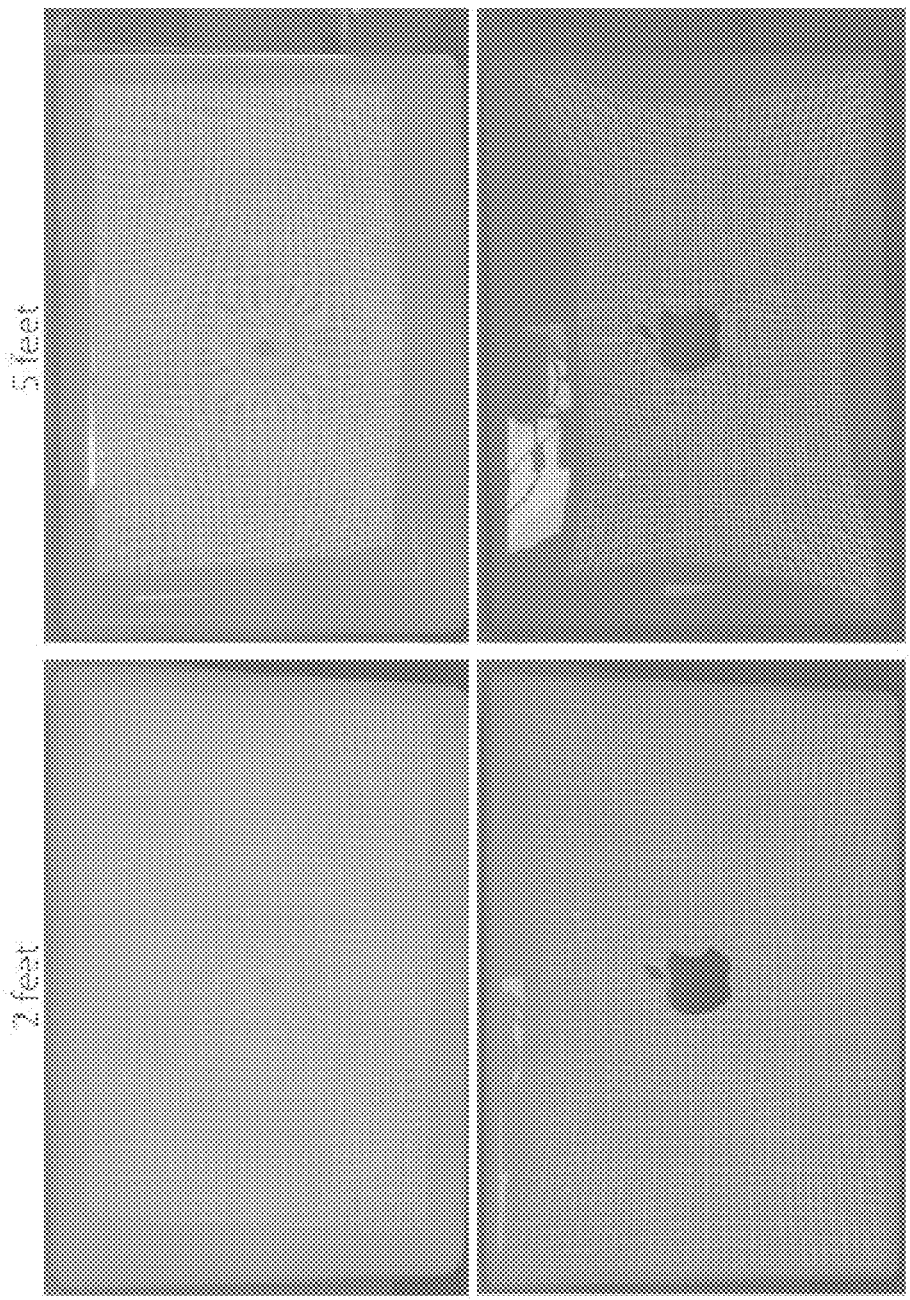
FIG. 14 illustrates distortion variations for reflected images.

FIG. 13A illustrates a captured image of a dot grid reflected from a second enclosure, and FIG. 13B shows the dots identified and some of the adjacency (connection) information assembled. A three dimensional surface estimate of the part is illustrated is FIG. 13D including concentric contour rings. FIG. 13C illustrates a resulting contour map of the estimated surface viewed from above. The method described can provide accurate results for even small variations in the shape of the reflective surface. The distortion in the projected image can increase as one increases the distance between the display, the image capture devices and the reflective object. FIG. 14 illustrates captured images for two different reflective objects, each reflective object placed at two different distances from the display and image capture devices. A regular grid of lines is projected onto a first case 1401 and onto a second case 1402 from a two foot distance and also from a five foot distance. The five foot distance reflected images show greater distortion.

Figure 15:
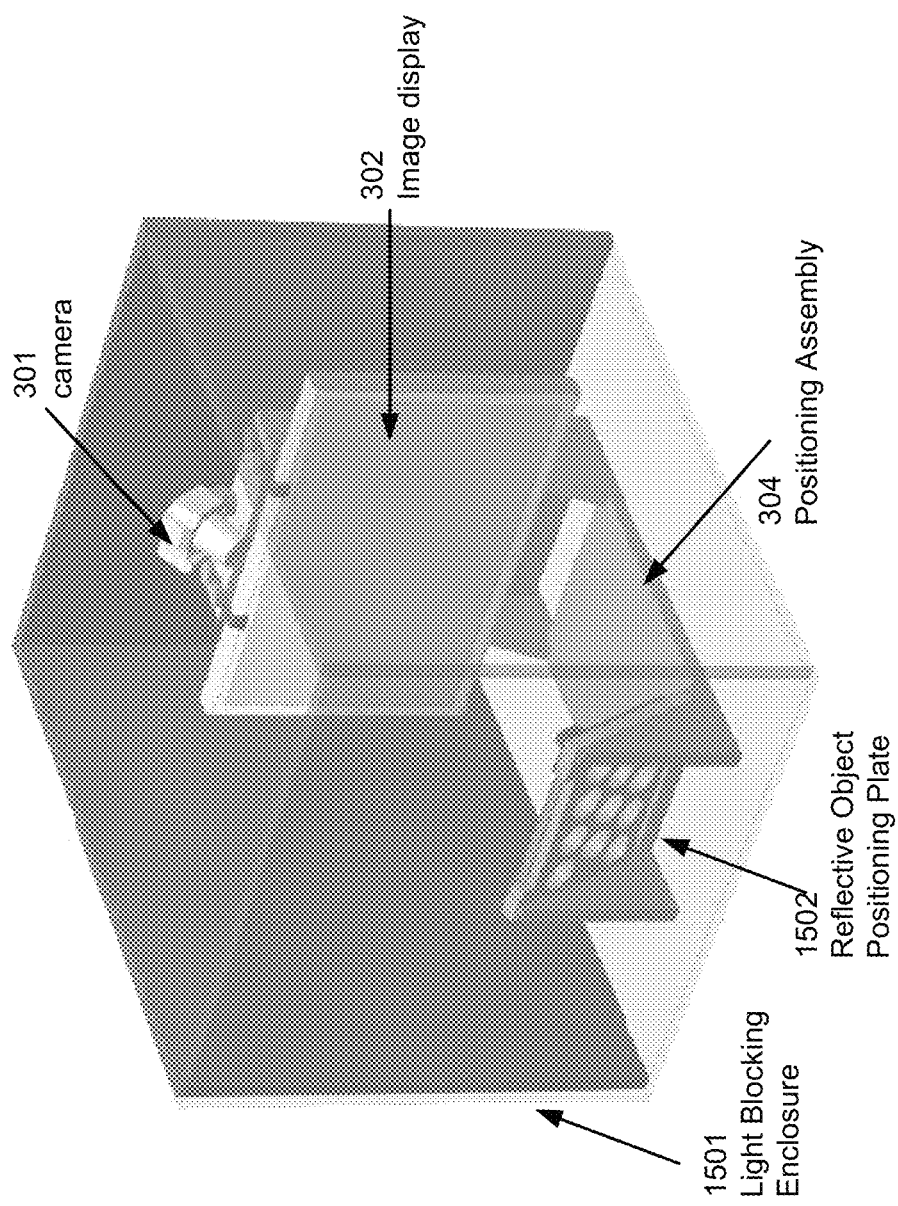
FIG. 15 illustrates a computer aided design model for a system to estimate the shape of a reflective object.

FIG. 15 illustrates a computer aided design diagram of a system for capturing images to estimate a surface shape of a reflective object. An image capture device (camera) 301 and an image display device (302) are mounted on a positioning assembly 304 which includes a positioning plate 1502 on which the reflective object can be oriented. A light blocking enclosure 1501 can reduce extraneous light from the ambient environment to improve the quality of an image projected by the image display 302 and captured by the camera 301.

Figure 16:
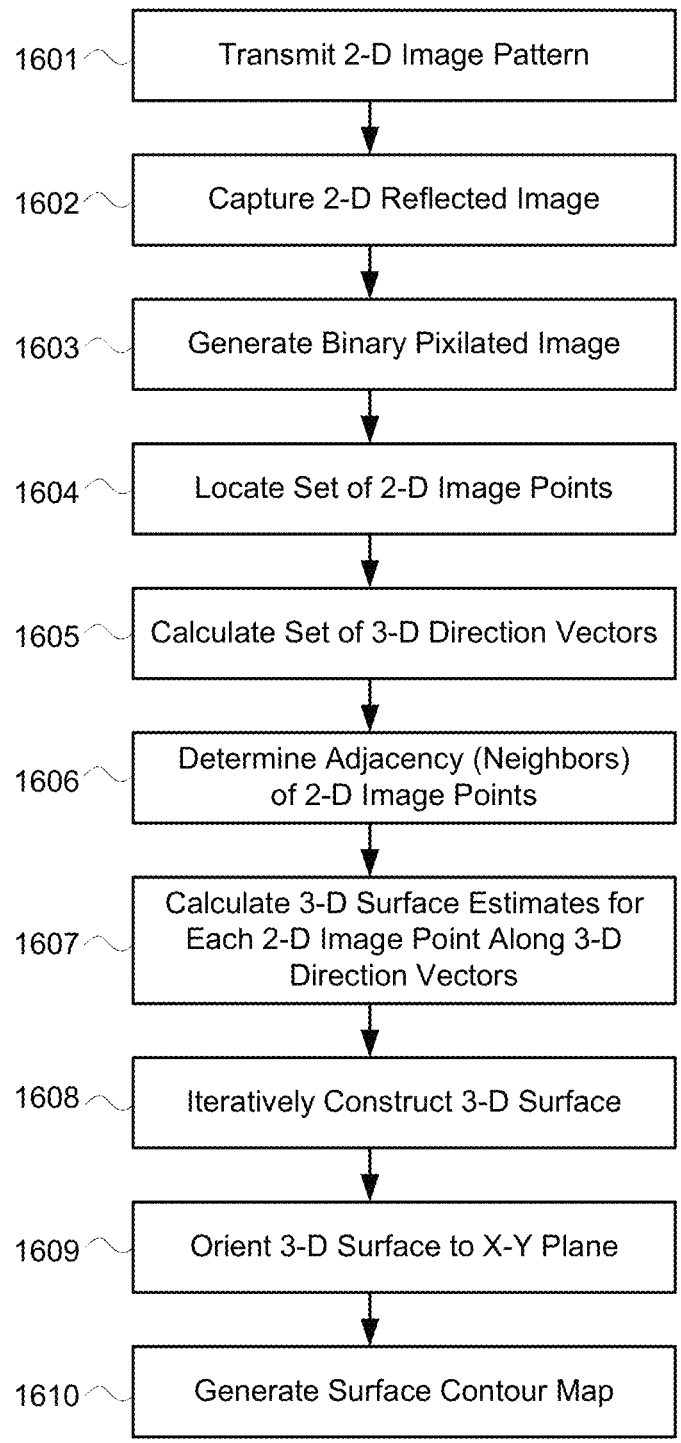
FIG. 16 outlines a method to generate a surface estimate of a reflective object.

FIG. 16 outlines a method to estimate a reflective surface shape. In step 1601 an image display device can transmit a two-dimensional image pattern toward a specular reflective object. This pattern can be a regular array of dots, lines, squares or other shapes with distinctly identifiable points. Preferably the image uses an array of light and dark regions with sharp edges. For example an image can include a plurality of light dots separated on a dark background, each dot being distinctly identifiable. In another embodiment the image can include a plurality of light lines arranged in a grid pattern on a dark background; where the lines intersect can be an identifiable point. In yet another embodiment the image can include a checkerboard pattern of light and dark squares where the four corners of four adjacent squares meet forming an identifiable point. Many different image patterns can be used by the method described herein, and the method is not limited to the exemplary image pattern described.

In step 1602 an image capture device captures a two-dimensional image of a reflection of the projected image. In a preferred embodiment, the image capture device is a digital still camera that can generate a digital pixilated image. The reflected image can contain a distorted version of the projected image, wherein the distortions can be caused by variations in the surface shape of the specular reflective object. In step 1603 a binary pixilated image can be generated from the captured pixilated two-dimensional reflected image. Preferably the binary pixilated image includes an array of pixel clusters, each pixel cluster corresponding to an individual identifiable point in the projected image. In step 1604 a set of two-dimensional image points can be identified and located using the binary pixilated image. Preferably each pixel cluster in the binary pixilated image generates a unique two-dimensional image point. In a preferred embodiment, the two-dimensional image point is a centroid of the pixel cluster. In step 1605, a set of three-dimensional direction vectors are calculated, one for each two-dimensional image point. Each three-dimensional vector can represent the direction that a light ray travels from a reflection point on the surface of the specular reflective object to the image plane of the image capture device for a respective two-dimensional image point. In step 1606 adjacency information can be determined for each of the two-dimensional image points relating each point to its neighboring points. In step 1607 a set of three-dimensional surface estimates can be calculated for each two-dimensional image point along its corresponding three-dimensional direction vector. Each element of the set of three-dimensional surface estimates can represent a different position and orientation of the reflective object's surface from which the two-dimensional image point can be reflected into the image capture device. In step 1608 a three-dimensional surface estimate of the reflective object can be iteratively constructed starting with one or more reference points of the surface. For each three-dimensional surface estimate, an element of a set of three-dimensional surface estimates for a two-dimensional image point can be chosen that minimizes a curvature function of a curve connecting the three-dimensional surface estimate to a previously estimated three dimensional surface estimate. In a preferred embodiment the curve includes a cubic polynomial function. In step 1609 the three-dimensional surface estimate can be oriented with respect to a reference plane. In step 1610 a surface contour map can be generated from the oriented three-dimensional surface estimate.

Figure 17A:
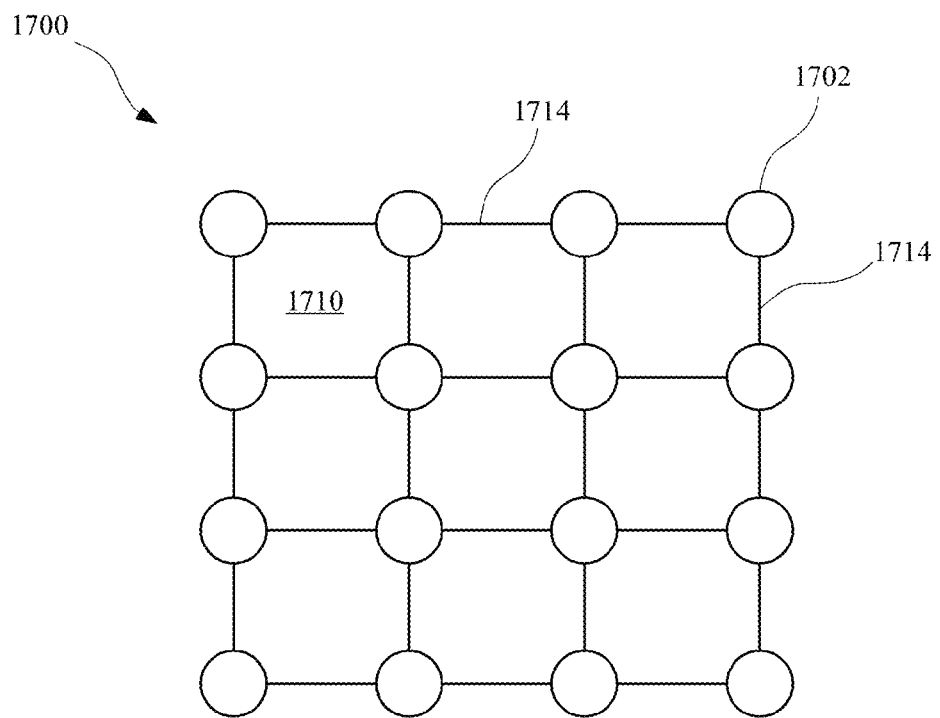
FIGS. 17A-17B illustrate an array of dots and modified array of dots used to estimate surface uniformity of a surface, as further discussed herein.
Figure 17B:
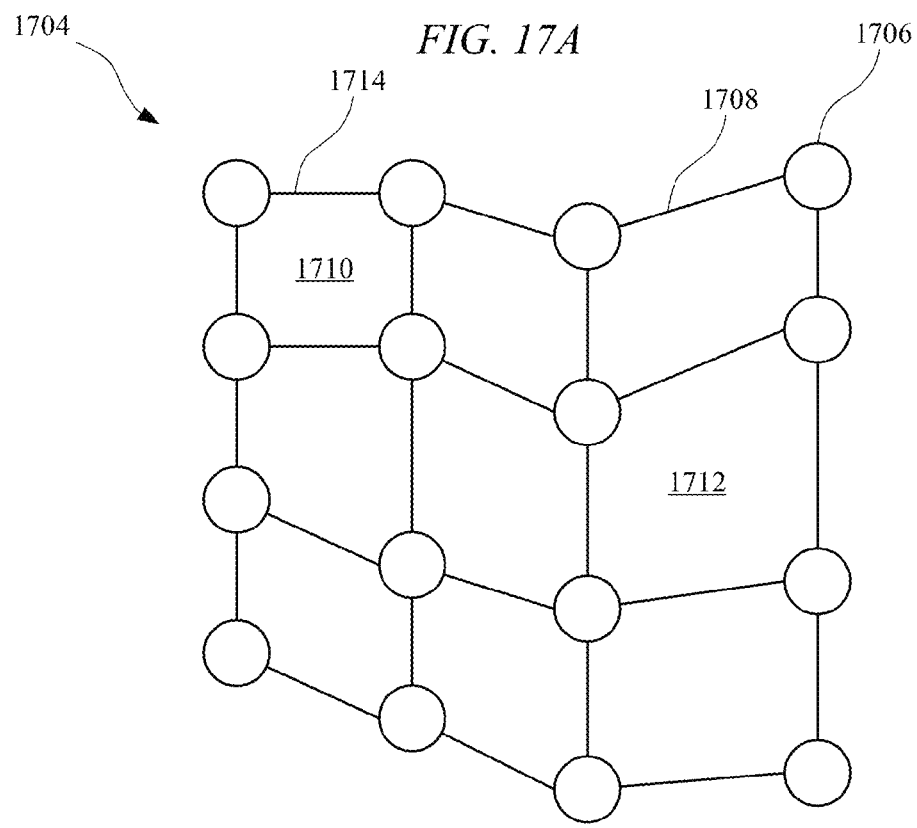

The described embodiments can also include various techniques related to determining curvature of a three-dimensional surface based on the location of a set of binary pixilated reflected dots 1103, e.g., as discussed with respect to FIG. 11. Specifically, as illustrated in FIG. 17A, a visual quality of a reflective three-dimensional surface can be quantitatively characterized based on how a regular array of dots 1700, having multiple original dots 1702, reflect off of the three-dimensional surface. Each original dot 1702 can reflect at different angles based on the curvature of the three-dimensional surface resulting in a distortion of the original array of dots. The original array of dots 1700 can be projected onto the three-dimensional surface and captured by an imaging device according to any of the embodiments discussed herein. Using one or more images captured by the imaging device, the original array of dots 1700 can be reconstructed as a "distorted" reflected array of dots 1704, as illustrated in FIG. 17B. Moreover, as discussed herein, branches 1714 that connect pairs of the original dots 1702 can be calculated for each original dot 1702. As shown in FIG. 17B, the reflected array of dots 1704, when reconstructed, can differ or be substantially the same in some ways when compared to the original array of dots 1700. For example, the reflected array of dots 1704 can be distorted by non-uniform portions of the reflective three-dimensional surface being characterized. In this way, a modified branch 1708 that connects two dots in the reflected array of dots 1704 appears to be distorted or rearranged when compared to an original branch 1714 that is not substantially modified when reflected from the three-dimensional surface. Additionally, a modified dot 1706 appears shifted from a position of a corresponding original dot 1702. The reflected array of dots 1704 can define a set of quadrilaterals, and each quadrilateral can be characterized by a set of boundary lengths, an area, and/or an orientation. The set of quadrilaterals can include unique shapes resulting from non-uniformities of the three-dimensional surface. For example, in some instances a reflected version of an original quadrilateral 1710 can substantially maintain the same values for the characterization properties (e.g., length, area, angle, etc.) as the original quadrilateral 1710 after the reflected array of dots 1704 reflects off the three-dimensional surface. A reflected quadrilateral having substantially the same properties as the original quadrilateral 1710 can indicate a level of uniformity in a region of the three-dimensional surface on which the original quadrilateral 1710 was incident (projected?). Alternatively, in some cases, a reflected quadrilateral can have a modified quadrilateral area 1712, which can result from non-uniformities of the three-dimensional surface. Differences in measured properties (characterizations) between the original array of dots 1700 and the reflected array of dots 1704 can be used as metrics for determining a visual quality and/or a uniformity of the three-dimensional surface. It should be noted that the various embodiments discussed herein can incorporate one or more varieties of shapes in place of the quadrilateral. For example, the original array of dots 1700 can include one or more polygons formed from the original dots 1702. Additionally, in some embodiments the original dots 1702 can be arranged in a random arrangement.

Figure 18A:
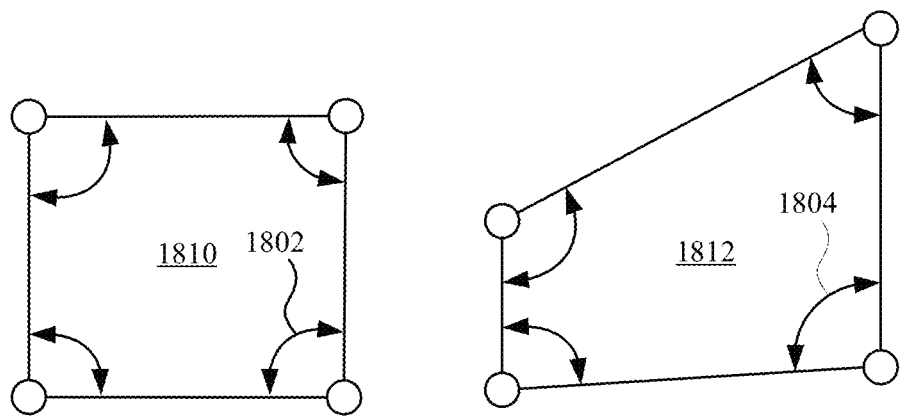
FIGS. 18A-18B illustrate geometric shapes and properties that can be derived from the modified array of dots and used to estimate uniformity of a surface, as further discussed herein.
Figure 18B:
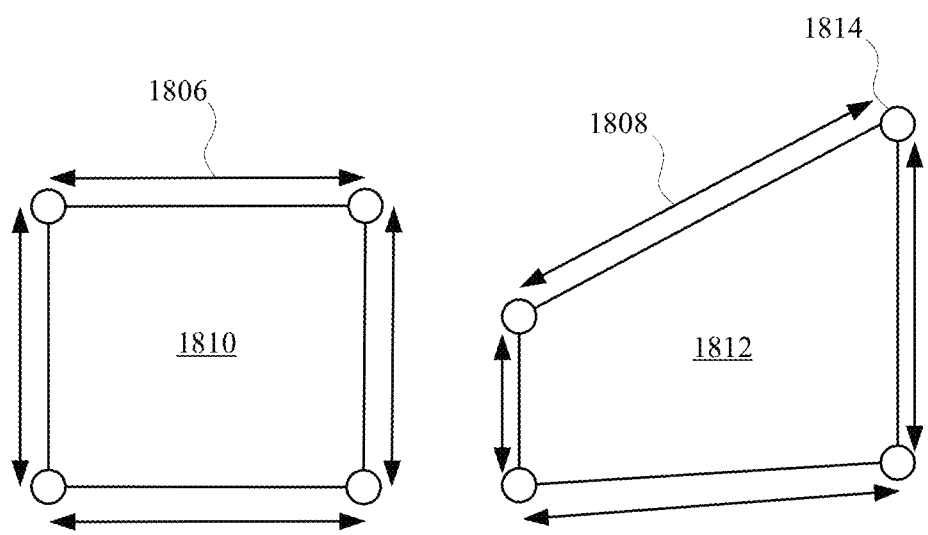

FIGS. 18A and 18B illustrate a modified quadrilateral 1812 and various metrics that can be used for determining the uniformity of the three dimensional surface based on analyzing a reflected version of a projected pattern, e.g., the array of dots 1700. Specifically, FIG. 18A illustrates a set of angles 1802 of the modified quadrilateral 1712 that can be determined and compared to themselves and/or to angles of other quadrilaterals of the array of dots 1700 and/or to angles of other quadrilaterals of the reflected array of dots 1704. For example, FIG. 18A illustrates an original quadrilateral 1810, which can be derived from the original array of dots 1700. FIG. 18A also illustrates a modified quadrilateral 1812 that can be derived from the reflected array of dots 1704, for which a set of modified angles 1804 can be calculated. The modified angles 1804 of the modified quadrilateral 1812 can be compared to the angles 1802 of the original quadrilateral 1810, thereby providing an indication of uniformity of the three-dimensional surface on which the array of dots 1700 was incident. In some embodiments, the modified angles 1804 can be compared to one or more predetermined angle values. For example, the modified angles 1804 can be compared to a suitable angle value with a predetermined tolerance (e.g., 90 degrees±3 degrees) in order to provide an indication of the uniformity of the three-dimensional surface.

FIG. 18B illustrates a set of "modified" lengths 1808 of the modified quadrilateral 1812 that can also be used, in some embodiments, as metrics or characterization properties for determining uniformity of the three-dimensional surface. Similar to the comparison of angles with respect to FIG. 18A, one or more dimensions of the modified quadrilateral 1812 can be determined. The dimensions can include one or more modified lengths 1808, which can be the distance between each of the dots 1814 at the corners of the modified quadrilateral 1812. The set of modified lengths 1808 can be compared to the original lengths 1806 to determine to what extent the original quadrilateral 1810 is modified when reflected by the three-dimensional surface. For example, when the modified lengths 1808 differ from the original lengths 1806, such as when the difference exceeds a tolerance threshold, an inference can be made that the area of the three-dimensional surface on which the original quadrilateral 1810 was incident upon is in some way not uniform or flat. Additionally, in some embodiments, the modified lengths 1808 can be compared to a predetermined length value, with or without a predetermined tolerance, in order to determine whether the surface on which the original quadrilateral 1810 was reflected is in some way not uniform or flat. Similarly, in some embodiments, the metrics for determining uniformity can be any suitable combination of angle, length, and or area measurements. For example, an area of the modified quadrilateral 1812 can be compared to an area of the original quadrilateral 1810. If the area of the modified quadrilateral 1812 is not substantially similar (e.g., equal to or within a certain tolerance) to the area of the original quadrilateral 1810, then an inference can be made that the area of the three-dimensional surface on which the original quadrilateral 1810 was incident upon is in some way not uniform or flat.

Figure 19:
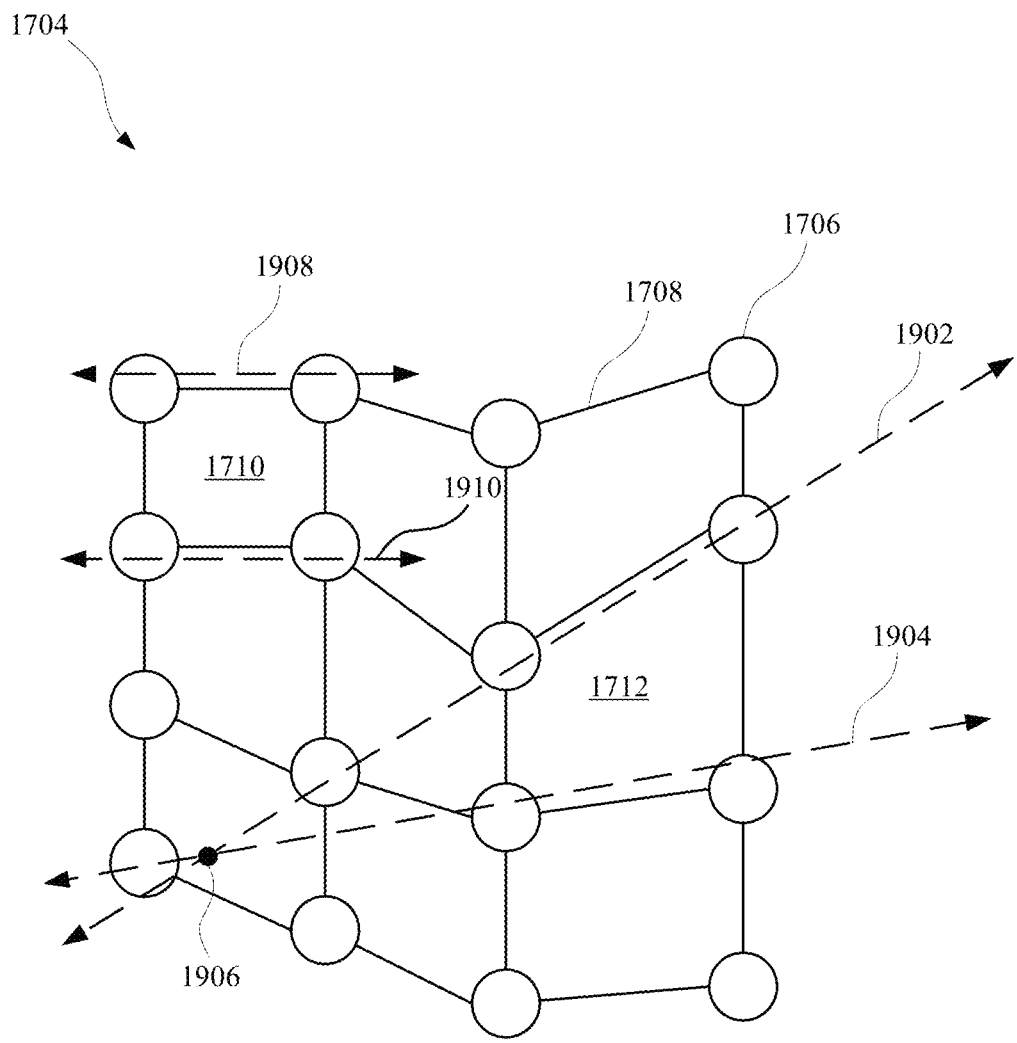
FIG. 19 illustrates how trajectories can be used to calculate surface uniformity according to some embodiments discussed herein.

FIG. 19 illustrates trajectories, which can be calculated in order to determine uniformity of the three-dimensional surface. Specifically, FIG. 19 illustrates the reflected array of dots 1704 including the original quadrilateral 1710 and the modified quadrilateral 1712. The reflected array of dots 1704 can include modified dots 1706, which are dots that have been shifted or otherwise rearranged from their original position after being reflected from a three-dimensional surface and captured by a camera, or any other suitable image capture device. As discussed herein, the modified branches 1708 connecting the reflected array of dots 1704 can be determined in order to derive various dimensions and metrics defining the original quadrilateral 1710 and modified quadrilateral 1712. Additionally, based on the reflected array of dots 1704, one or more trajectories can be calculated and compared in order to determine the uniformity of the three-dimensional surface from which the reflected array of dots 1704 was incident upon. The trajectories can indicate non-uniformities when the trajectories are non-parallel, intersect, or otherwise indicate differences between one or more original trajectories of the original array of dots 1700. For example, the original quadrilateral 1710 can be included in the reflected array of dots 1704 when the three-dimensional surface includes a substantially uniform portion upon which the original array of dots 1700 was reflected, thereby indicating that the original quadrilateral 1710 was not modified during reflection. A first uniform trajectory 1908 and a second uniform trajectory 1910 can be determined parallel based on the original quadrilateral 1710 being reflected from the uniform portion. In this way, because the original quadrilateral 1710 was defined by substantially parallel trajectories before and after the reflected array of dots 1704 resulted from the reflection on the three-dimensional surface, an inference can be made that the location of incidence or reflection of the original quadrilateral 1710 is uniform.

Alternatively, a first modified trajectory 1902 and a second modified trajectory 1904 can be calculated based on the modified quadrilateral 1712 being reflected from the three-dimensional surface. The first modified trajectory 1902 and the second modified trajectory 1904 can be determined to be non-parallel and thus provide an indication that the location of incidence of the dots defining the modified quadrilateral 1712 is not a uniform portion of the three-dimensional surface. Moreover, one or more trajectories can be based on the locations of any number of modified dots 1706. For example, two modified dots 1706 can be used for each trajectory, thus allowing multiple straight trajectory lines to be used to determine non-uniformities of the three-dimensional surface. More than two modified dots 1706 can be used for defining one or more trajectories, allowing one or more parabolic trajectory lines to be used to determine non-uniformities of the three-dimensional surface. For example, the changes in the trajectory of a parabolic trajectory line can be indicative of the non-uniformity of the three-dimensional surface when the trajectory of a parabolic trajectory varies away from a substantially straight line, or any other suitable line for gaging uniformity.

In some embodiments, an intersection 1906 can be calculated from the first modified trajectory 1902 and the second modified trajectory 1904. The location of the intersection 1906 in comparison to one or more of the reflected dots of the modified array of dots 1704 can be indicative of the uniformity of the three-dimensional surface. For example, if the intersection 1906 is further away from one of the dots defining the modified quadrilateral 1712, the first modified trajectory 1902 and the second modified trajectory 1904 are more likely to be parallel. Conversely, if the intersection 1906 is proximate to one of the dots defining the modified quadrilateral 1712, the first modified trajectory 1902 and the second modified trajectory 1904 are more likely to not be parallel, inidicating a location of non-uniformity.

Figures 20A, 20B:
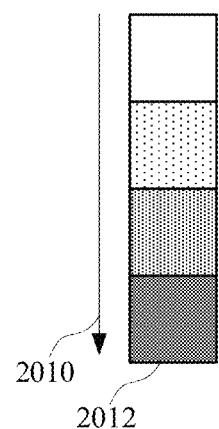
FIGS. 20A-20B illustrate compilations of ranks of uniformity based on the calculation of geometric properties of the reflected array of dots, as further discussed herein.

FIGS. 20A and 20B illustrate examples of a compilation of visual indicators for surface uniformity of the three-dimensional surface, as discussed herein. Specifically, FIG. 20A illustrates a compilation 2000 of visual indicators for surface uniformity, wherein the compilation 2000 includes only substantially uniform indicators 2002. The visual indicators can be derived from the various inferences, metrics, and characterizations established herein with respect to uniformity of the three-dimensional surface. For example, the substantially uniform indicator 2002 can be included in the compilation 2000 when the angles between dots are substantially equal to a predetermine value, when the area of a quadrilateral is substantially equal to a predetermined area, and/or when one or more trajectories of a side of a quadrilateral is substantially equal to a predetermined orientation (e.g., when two trajectories are substantially parallel), as further discussed herein. The substantially uniform indicators 2002 can include one or more colors, patterns, numbers, characters, or any other suitable indicator for defining a specific metric. In this way, a human or machine can determine from looking at compilation 2000 that the surface from which the visual indicators are derived is substantially uniform or flat.

FIG. 20B illustrates a compilation 2014 of visual indicators for surface uniformity, wherein the compilation 2014 includes multiple different visual indicators. Specifically, as a result of one or more processes and inferences discussed herein, a variety of visual indicators can be derived for indicating the severity of non-uniformity for a three-dimensional surface. The compilation 2014 of visual indicators can be arranged according to the original array of dots 1700, as illustrated in FIG. 20B, in order for a human or machine to more readily determine uniformity of the three-dimensional surface. In this way, the data derived from the reflected array of dots 1704 can be arranged into a shape similar to the original array of dots 1700 while simultaneously providing visual indications of non-uniformity of the three-dimensional surface on which the original array of dots 1700 was incident. For example, when a portion of the three-dimensional surface is substantially uniform, the substantially uniform indicator 2002 can be associated with that portion. When portions of the three-dimensional surface are not substantially uniform, other visual indicators can be provided for setting forth how severe or to what degree the non-uniformities are. For example, a rank of uniformity 2012 can be provided, wherein the non-uniformity arrow 2010 sets forth the direction in which the various indicators go from substantially uniform to substantially non-uniform. The rank of uniformity 2012 can assist a human or machine when reading the compilation 2014 of visual indicators. In this way, a determination can be made that a second ranked uniformity 2004 is directly below the substantially uniform indicator 2002 on the rank of uniformity 2012, thereby indicating that the second rank uniformity 2004 is less uniform than the substantially uniform indicator 2002. Moreover, the third rank uniformity 2006 and the fourth rank uniformity 2008 also fall below the second rank uniformity 2004 on the rank of uniformity 2012 and are therefore indicative of even less uniform areas on the three-dimensional surface. As discussed herein, each rank of uniformity can be a color, gradient, pattern, number, character, or any other suitable indicator for establishing a rank for a particular condition or measurement (e.g., non-uniformity). For example, a dense pattern or dark color can indicate a more non-uniform portion of a three-dimensional surface whereas a less dense pattern or light color can indicate a more uniform portion of the three-dimensional surface.

Figure 21:
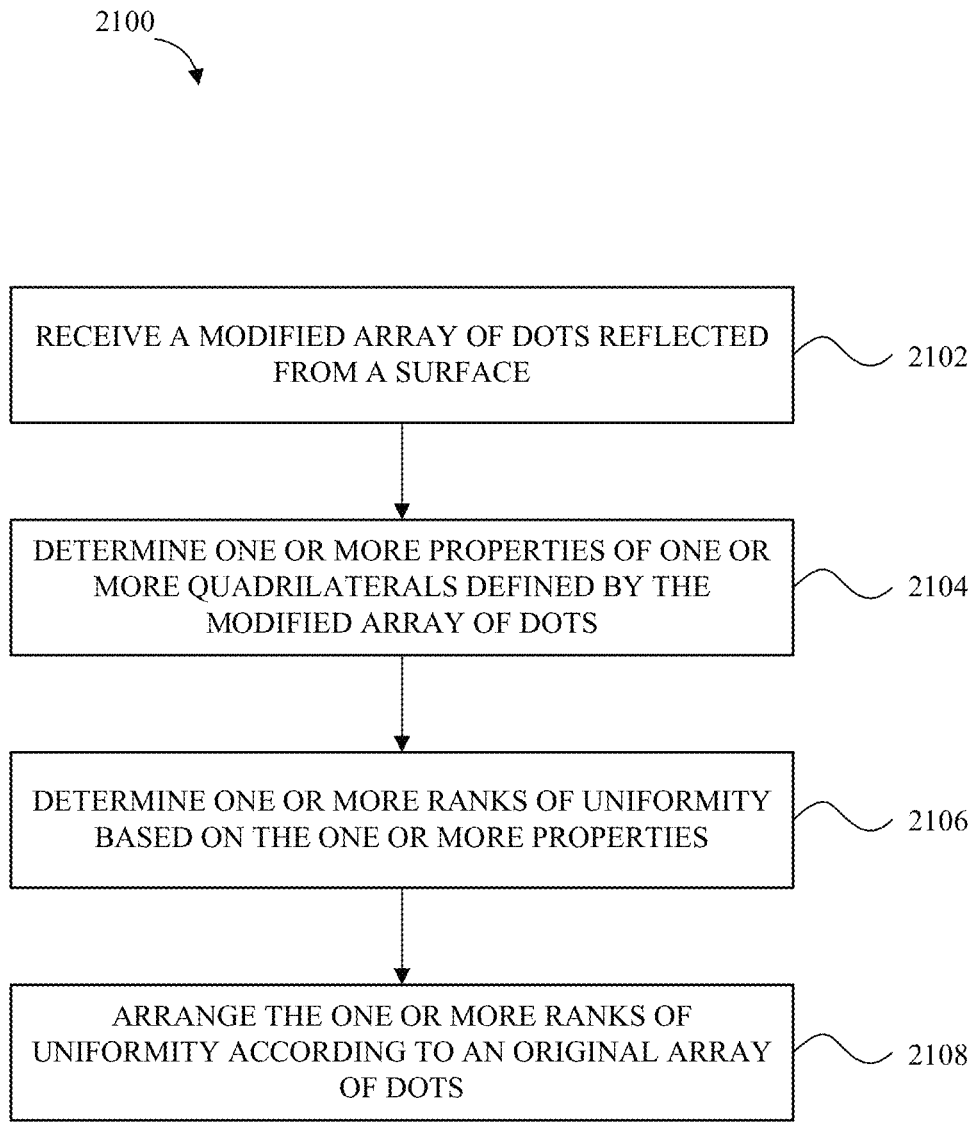
FIG. 21 illustrates a method for determining uniformity of a surface based on geometric properties of a reflected array of dots, as further discussed herein.

FIG. 21 illustrates a method 2100 for generating an arrangement of uniformity ranks derived from an array of dots reflected off of a three-dimensional surface, according to some embodiments discussed herein. The method 2100 includes a step 2102 of receiving, at an image analysis service, a modified array of dots reflected from a surface. The image analysis service can be a program stored on a computing device for determining uniformity of three-dimensional surfaces according any of the embodiments discussed herein. As further discussed herein, the array of dots can be composed of light, and the surface can be a three-dimensional surface such a housing for a computing device. The dots can be arranged in an array that resembles a compilation of quadrilaterals, polygons, triangles, or any other suitable geometric shape. At step 2104, the image analysis service can determine one or more characterizations of one or more quadrilaterals defined by the array of dots. The one or more characterizations can includes angles defined by the sides of the quadrilaterals, lengths of the sides of the quadrilaterals, the area of the quadrilaterals, trajectories calculated based on the array of dots, or any other suitable property for indicating non-uniformities in the surface from which the array of dots was reflected. At step 2106, the image analysis service can determine one or more ranks of uniformity based on the one or more characterizations determined at step 2104. The ranks of uniformity can be an indication of severity of a non-uniformity in a portion of the three-dimensional surface. Each rank of the ranks of uniformity can be designated a color, character, pattern, number, or any other suitable indicator for ranking a physical property of a surface. For example, and as discussed herein, a rank associated with a portion of the three-dimensional surface that is substantially uniform can be assigned a light color or less dense pattern compared to a portion that is substantially non-uniform. At step 2108, the image analysis service can arrange the one or more ranks of uniformity according to an original array of dots, thus creating a compilation of visual indicators. The compilation of visual indicators can be stored as an array of data on a memory of the computing device and be analyzed by a human or machine, as discussed herein, for determining the uniformity of the three-dimensional surface.

Figure 22:
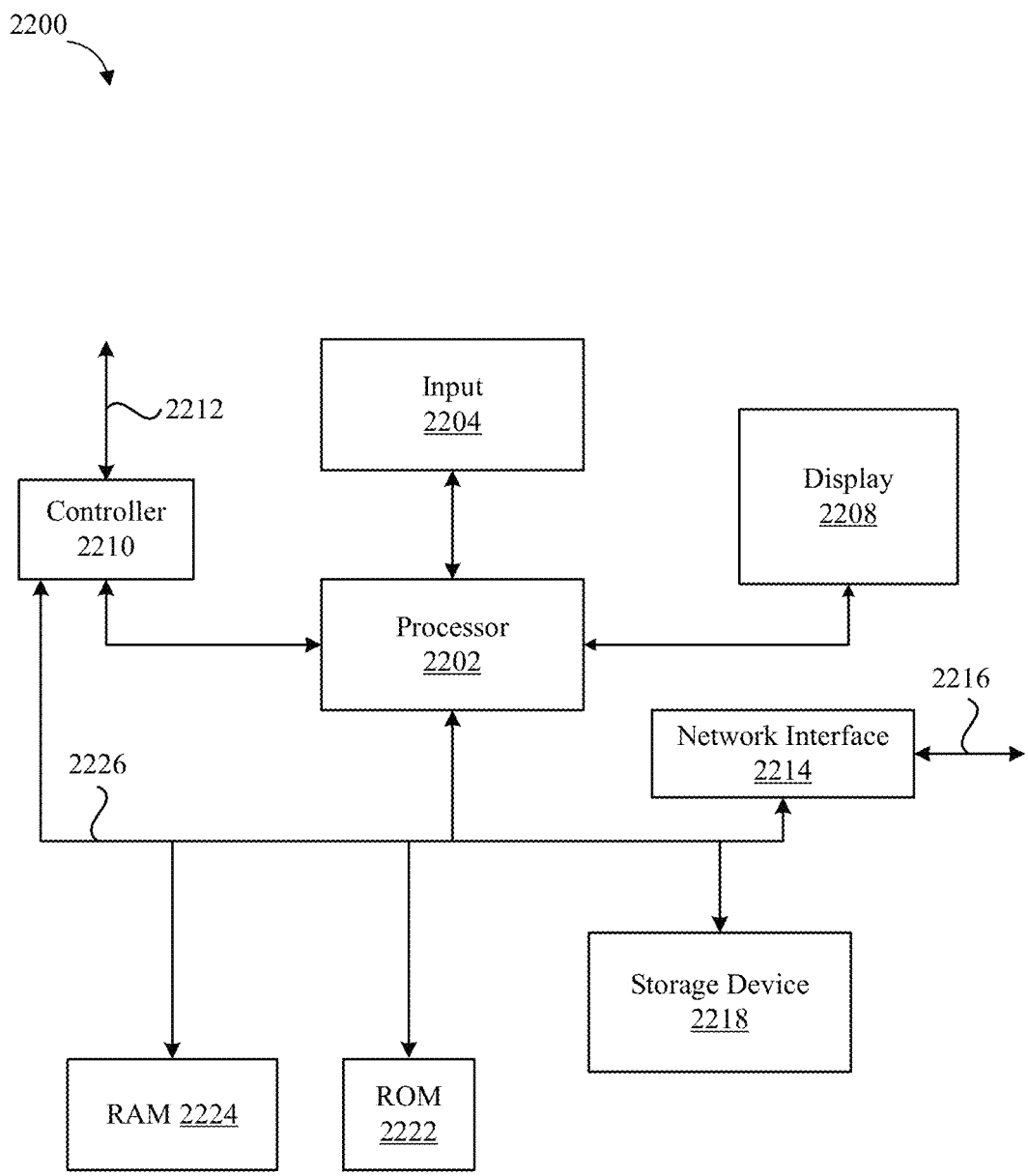
FIG. 22 illustrates a diagram of a computing device capable of performing the various embodiments discussed herein.

FIG. 22 is a block diagram of a computing device 2200 that can represent the components of the various embodiments discussed herein. It will be appreciated that the components, devices or elements illustrated in and described with respect to FIG. 22 may not be mandatory and thus some may be omitted in certain embodiments. The computing device 2200 can include a processor 2202 that represents a microprocessor, a coprocessor, circuitry and/or a controller for controlling the overall operation of computing device 2200. Although illustrated as a single processor, it can be appreciated that the processor 2202 can include a plurality of processors. The plurality of processors can be in operative communication with each other and can be collectively configured to perform one or more functionalities of the computing device 2200 as described herein. In some embodiments, the processor 2202 can be configured to execute instructions that can be stored at the computing device 2200 and/or that can be otherwise accessible to the processor 2202. As such, whether configured by hardware or by a combination of hardware and software, the processor 2202 can be capable of performing operations and actions in accordance with embodiments described herein.

The computing device 2200 can also include user input device 2204 that allows a user of the computing device 2200 to interact with the computing device 2200. For example, user input device 2204 can take a variety of forms, such as a button, keypad, dial, touch screen, audio input interface, visual/image capture input interface, input in the form of sensor data, etc. Still further, the computing device 2200 can include a display 2208 (screen display) that can be controlled by processor 2202 to display information to a user. Controller 2210 can be used to interface with and control different equipment through equipment control bus 2212. The computing device 2200 can also include a network/bus interface 2214 that couples to data link 2216. Data link 2216 can allow the computing device 2200 to couple to a host computer or to accessory devices. The data link 2216 can be provided over a wired connection or a wireless connection. In the case of a wireless connection, network/bus interface 2214 can include a wireless transceiver.

The computer device 2200 can also include a storage device 2218, which can have a single disk or a plurality of disks (e.g., hard drives) and a storage management module that manages one or more partitions (also referred to herein as "logical volumes") within the storage device 2218. In some embodiments, the storage device 2220 can include flash memory, semiconductor (solid state) memory or the like. Still further, the computing device 2200 can include Read-Only Memory (ROM) 2222 and Random Access Memory (RAM) 2222 and. The ROM 2222 can store programs, code, instructions, utilities or processes to be executed in a non-volatile manner. The RAM 2224 can provide volatile data storage, and stores instructions related to components of the storage management module that are configured to carry out the various techniques described herein. The computing device can further include data bus 2226. Data bus 2226 can facilitate data and signal transfer between at least processor 2202, controller 2210, network interface 2214, storage device 2218, ROM 2222, and RAM 2224.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A system for determining uniformity of a reflective surface, comprising:
    a computing device configured to perform image analysis;
    a light emitting device operatively coupled to the computing device, wherein the light emitting device is configured to emit an original pattern of light onto the reflective surface, the original pattern of light including an original array of disconnected dots that define a plurality of original polygons; and
    a light capturing device operatively coupled to the computing device, wherein the light capturing device is configured to receive at a receiving surface thereof a reflected pattern of light from the reflective surface, the reflected pattern of light including a reflected array of disconnected dots that define a plurality of reflected polygons corresponding to the plurality of original polygons,
        and wherein the computing device is configured to perform an image analysis on the reflected pattern of light in order to provide an estimate of surface uniformity for the reflective surface, wherein the image analysis includes calculating the area for each of the plurality of reflected polygons on the receiving surface.

2. The system of claim 1, wherein the image analysis includes comparing the area of each reflected polygon to a predetermined area value, and generating multiple ranks of uniformity based on the comparing.

3. The system of claim 2, wherein image analysis further includes compiling the multiple ranks of uniformity into a two-dimensional array for visualizing the multiple ranks of uniformity.

4. The system of claim 1, wherein each dot of the plurality of disconnected dots defines a corner of each reflected polygon of the plurality of reflected polygons.

5. The system of claim 4, wherein calculating the area includes determining a distance between each dot of the plurality of disconnected dots.

6. The system of claim 1, wherein the reflective surface is a portion of a housing of a portable computing device.

7. The system of claim 1, wherein the image analysis includes comparing the area of each reflected polygon to a predetermined area value, and when the area is substantially equal to the predetermined area value, a uniformity indicator characterizing the portion of the reflective surface from which the reflected polygon was incident upon is stored in a memory of the computing device.

8. A method of manufacturing a device housing, the method comprising:
    projecting an arrangement of light onto a surface of the device housing, wherein the arrangement of light includes a plurality of projected light points;
    sampling a reflection of the arrangement of light reflected from the surface, wherein the reflection includes a plurality of reflected light points corresponding to the plurality of projected light points;
    determining coordinates for one or more light points of the plurality of reflected light points;
    generating characterization data based on the coordinates for the one or more reflected light points;
    generating ranks of uniformity for portions of the reflection based on the characterization data, wherein uniformity of a portion represents the amount of change between the projected portion and the reflected portion for that portion; and
    compiling the ranks of uniformity into an array of ranks having an order corresponding to the arrangement of light.

9. The method of claim 8, wherein the arrangement of light includes an original array of light dots arranged into one or more polygons.

10. The method of claim 8, wherein generating characterization data includes determining a distance between two light points based on coordinates of the two light points.

11. The method of claim 8, wherein generating characterization data includes determining a slope of a trajectory defined by coordinates of two or more light points.

12. The method of claim 8 wherein generating characterization data includes determining an area of a polygon defined by coordinates of three or more light points.

13. The method of claim 8, wherein each wherein the ranks of uniformity include one or more alphanumeric characters arranged in the array of ranks.

14. The method of claim 8, wherein the compilation of uniformity ranks includes multiple quadrilaterals arranged in a substantially similar orientation as the array of shapes of the light pattern.

15. A surface analyzing device configured to analyze a surface for a computing device housing, comprising:
    a camera;
    a processor operatively coupled to the camera; and
    a memory storing instructions that when executed by the processor cause the surface analyzing device to perform the steps of:
        sampling image data corresponding to a reflected quantity of light received by the camera;
        determining a characteristic property of each shape of one or more shapes of the reflected quantity of light, wherein the one or more shapes are defined by dots of light;
        comparing the characteristic property to a threshold value, wherein the threshold value is an indicator for a substantially uniform portion of the surface;
        generating a characterization value for each shape of the one or more shapes based on the comparing; and
        generating a data array comprising each characterization value.

16. The surface analyzing device of claim 15, wherein the reflected quantity of light corresponds to an original quantity of light originating from a light source of the surface analyzing device.

17. The surface analyzing device of claim 15, wherein the light source is configured to restrict the original quantity of light to a perimeter of the computing device housing when the original quantity of light is incident upon the computing device housing.

18. The surface analyzing device of claim 15, wherein determining the characterization property includes determining a side length of each of the one or more shapes.

19. The surface analyzing device of claim 15, wherein determining the characterization property includes determining an angle between two sides of each of the one or more shapes.

20. The surface analyzing device of claim 15, wherein determining the characterization property includes determining an area of each of the one or more shapes.

* * * * *